US010491425B2

United States Patent
Park et al.

(10) Patent No.: US 10,491,425 B2
(45) Date of Patent: Nov. 26, 2019

(54) DEVICE AND METHOD FOR SHARING CONTENTS IN ELECTRONIC DEVICE WITH OTHER ELECTRONIC DEVICE

(71) Applicant: Samsung Electronics Co., Ltd., Gyeonggi-do (KR)

(72) Inventors: Seong-Hee Park, Seoul (KR); Myoung-Hwan Lee, Gyeonggi-do (KR); Tae-Young Lee, Seoul (KR); Kwang-Hoon Han, Gyeonggi-do (KR); Chil-Youl Yang, Gyeonggi-do (KR); Dohy Hong, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/514,370

(22) PCT Filed: Jul. 30, 2015

(86) PCT No.: PCT/KR2015/007985
§ 371 (c)(1),
(2) Date: Mar. 24, 2017

(87) PCT Pub. No.: WO2016/047917
PCT Pub. Date: Mar. 31, 2016

(65) Prior Publication Data
US 2017/0285788 A1  Oct. 5, 2017

(30) Foreign Application Priority Data

Sep. 25, 2014 (KR) .................. 10-2014-0128597
Mar. 10, 2015 (KR) .................. 10-2015-0033276

(51) Int. Cl.
*G06F 3/045* (2006.01)
*H04L 12/54* (2013.01)
(Continued)

(52) U.S. Cl.
CPC ............ *H04L 12/56* (2013.01); *G06F 3/0488* (2013.01); *G06F 3/1454* (2013.01);
(Continued)

(58) Field of Classification Search
CPC .... G06F 3/0412; G06F 3/0484; G06F 3/0488; G06F 3/14; G06F 3/1454; G06F 13/38;
(Continued)

(56) References Cited

U.S. PATENT DOCUMENTS 9,848,449 B2 * 12/2017 Wang .................... H04W 8/005
2009/0111378 A1   4/2009 Sheynman et al.
(Continued)

FOREIGN PATENT DOCUMENTS

EP         2 696 643      2/2014
KR         101409824      6/2014
(Continued)

OTHER PUBLICATIONS

PCT/ISA/210 Search Report issued on PCT/KR2015/007985 (pp. 3).

(Continued)

*Primary Examiner* — Joe H Cheng
(74) *Attorney, Agent, or Firm* — The Farrell Law Firm, P.C.

(57) ABSTRACT

The present disclosure relates to a 5G or pre-5G communication system which is provided to support a higher data transmission rate after 4G communication systems such as LTE. A first electronic device according to an embodiment of the present invention comprises a control unit, an input unit, an output unit and a communication unit. The input unit recognizes occurrence of a touch input for transmitting or receiving contents, and the communication unit, on the basis of the received signal strength of a search signal or a response signal received from at least one other electronic
(Continued)

device, transmits the contents to the at least one other electronic device or receives the contents from the at least one other electronic device.

16 Claims, 28 Drawing Sheets

(51) Int. Cl.
| | |
|---|---|
| H04W 76/10 | (2018.01) |
| H04W 4/80 | (2018.01) |
| H04L 29/08 | (2006.01) |
| G06F 3/0488 | (2013.01) |
| H04W 8/00 | (2009.01) |
| H04L 25/02 | (2006.01) |
| H04L 12/58 | (2006.01) |
| H04W 52/26 | (2009.01) |
| G06F 3/14 | (2006.01) |
| H04W 88/06 | (2009.01) |

(52) U.S. Cl.
CPC ........ *H04L 25/028* (2013.01); *H04L 25/0272* (2013.01); *H04L 51/38* (2013.01); *H04L 67/06* (2013.01); *H04W 4/80* (2018.02); *H04W 8/00* (2013.01); *H04W 8/005* (2013.01); *H04W 52/267* (2013.01); *H04W 76/10* (2018.02); *G09G 2370/042* (2013.01); *G09G 2370/16* (2013.01); *H04W 88/06* (2013.01); *Y02D 70/00* (2018.01); *Y02D 70/14* (2018.01); *Y02D 70/20* (2018.01)

(58) Field of Classification Search
CPC ....... G06F 13/387; H04L 12/26; H04L 51/00; H04L 51/38; H04W 4/00; H04W 4/023; H04W 8/005; H04W 8/02; H04W 8/08; H04W 8/12; H04W 48/20; H04M 1/7253; H04M 1/72563; H04M 1/72569; H04B 5/0031; H04B 7/00
See application file for complete search history.

(56) References Cited

U.S. PATENT DOCUMENTS

| | | | | |
|---|---|---|---|---|
| 2010/0048256 | A1 | 2/2010 | Huppi et al. | |
| 2010/0317289 | A1* | 12/2010 | Desai | H04B 17/318 455/41.2 |
| 2011/0083111 | A1* | 4/2011 | Forutanpour | H04W 4/21 715/863 |
| 2011/0283334 | A1* | 11/2011 | Choi | G06F 3/04883 725/148 |
| 2012/0036218 | A1* | 2/2012 | Oh | G06F 17/30879 709/217 |
| 2012/0159472 | A1* | 6/2012 | Hong | H04W 4/21 717/178 |
| 2012/0185583 | A1* | 7/2012 | Wu | H04W 76/10 709/224 |
| 2012/0197765 | A1* | 8/2012 | Kim | G06Q 30/0601 705/27.1 |
| 2012/0269072 | A1* | 10/2012 | Wu | H04W 52/242 370/242 |
| 2012/0287034 | A1* | 11/2012 | Park | H04L 12/2807 345/156 |
| 2012/0289158 | A1* | 11/2012 | Palin | H04W 8/005 455/41.2 |
| 2012/0289160 | A1* | 11/2012 | Palin | H04W 48/14 455/41.2 |
| 2012/0317198 | A1* | 12/2012 | Patton | G06Q 10/10 709/204 |
| 2013/0059606 | A1* | 3/2013 | Pujol | H04W 4/023 455/456.3 |
| 2013/0247117 | A1* | 9/2013 | Yamada | G08C 17/02 725/93 |
| 2014/0038718 | A1* | 2/2014 | Kothari | G06F 9/44526 463/40 |
| 2014/0064116 | A1 | 3/2014 | Linde et al. | |
| 2014/0179234 | A1 | 6/2014 | Lee et al. | |
| 2014/0233755 | A1 | 8/2014 | Kim et al. | |
| 2014/0237048 | A1* | 8/2014 | Lee | G06F 9/54 709/204 |
| 2015/0012581 | A1* | 1/2015 | Kim | H04W 4/70 709/201 |
| 2015/0050880 | A1* | 2/2015 | Choi | H04W 76/10 455/39 |
| 2015/0052221 | A1* | 2/2015 | Yoon | H04W 4/008 709/217 |
| 2015/0195768 | A1* | 7/2015 | Abraham | H04L 67/16 370/254 |
| 2015/0215861 | A1 | 7/2015 | Kim | |
| 2015/0237515 | A1* | 8/2015 | Park | H04W 24/08 455/405 |
| 2015/0327023 | A1* | 11/2015 | Park | H04W 4/043 455/456.3 |
| 2015/0365986 | A1* | 12/2015 | Lee | H04W 4/008 370/329 |
| 2016/0014722 | A1* | 1/2016 | Yoon | H04W 72/02 455/426.1 |

FOREIGN PATENT DOCUMENTS

| | | |
|---|---|---|
| KR | 1020140082223 | 7/2014 |
| KR | 1020140104215 | 8/2014 |
| WO | WO 2014051390 | 4/2014 |

OTHER PUBLICATIONS

PCT/ISA/237 Written Opinion issued on PCT/KR2015/007985 (pp. 6).
European Search Report dated Aug. 22, 2017 issued in counterpart application No. 15844527.0-1870, 7 pages.
AirDrop, Wikipedia, the free encyclopedia, https://en.wikipedia.org/wiki/AirDrop, Aug. 30, 2017, 4 pages.
European Search Report dated Jul. 10, 2019 issued in counterpart application No. 15844527.0-1218, 5 pages.

\* cited by examiner

DEVICE AND METHOD FOR SHARING CONTENTS IN ELECTRONIC DEVICE WITH OTHER ELECTRONIC DEVICE

PRIORITY

This application is a National Phase Entry of PCT International Application No. PCT/KR2015/007985, which was filed on Jul. 30, 2015, and claims priority to Korean Patent Application No. 10-2014-0128597, which was filed on Sep. 25, 2014, and Korean Patent Application No. 10-2015-0033276, which was filed on Mar. 10, 2015, the contents of each of which are incorporated herein by reference.

TECHNICAL FIELD

The present invention relates to a technology for transmitting contents from an electronic device to other electronic device.

BACKGROUND

In order to meet wireless data traffic demands that have increased after system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, an implementation of the 5G communication system in a mm Wave band (for example, 60 GHz band) is being considered. In the 5G communication system, technologies such as beamforming, massive MIMO, Full Dimensional MIMO (FD-MIMO), array antenna, analog beam-forming, and large scale antenna are discussed to mitigate a propagation path loss in the mm Wave band and increase a propagation transmission distance.

Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and has received interference cancellation to improve the system network.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Due to the development of communication technology, a technology which can perform device to device (D2D) communication between adjacent terminals without going through a base station has been developed. A user of a terminal having the D2D communication function may connect the terminal to another terminal at a close location, which has the D2D communication function, through the D2D communication technology.

However, when a plurality of other terminals exist, the user has difficulty in intuitively recognizing other terminals corresponding to a list of the plurality of terminals, by checking only the list of the plurality of terminals. In addition, the user of the terminal has difficulty in selecting a communication mode for establishing a communication connection with another terminal, which has a different communication method (connectivity) from the terminal.

SUMMARY

A first electronic device according to an embodiment of the present invention includes: a control unit; an input unit; an output unit; and a communication unit. The input unit recognizes occurrence of a touch input for transmitting or receiving contents, and the communication unit transmits the contents to at least one other electronic device or receives the contents from the at least one other electronic device based on the received signal strength of a discovery signal or a response signal, received from at least one other electronic device.

A first electronic device according to an embodiment of the present invention includes: a display unit; an output unit; a controller; and a communication unit, wherein the controller controls at least one of the display unit and the output unit so as to indicate that content transmission to a second electronic device or content reception from the second electronic device is possible, and the communication unit includes at least one of a first communication unit for low energy communication, a second communication unit for wireless LAN communication, and a third communication unit for mobile communication, and is configured to transmit or receive contents to or from the second electronic device through at least one of the first communication unit, the second communication unit, and the third communication unit based on a discovery signal or a response signal, received from the second electronic device.

A first electronic device according to an embodiment of the present invention includes: a communication unit; and an output unit, wherein the communication unit is configured to transmit information on the first electronic device to a second electronic device connected to the first electronic device, receive, from the second electronic device, a message requesting transmission, to a third electronic device, of a response signal for a discovery signal transmitted by the third electronic device, transmit, to the third electronic device, a response signal for the discovery signal received from the third electronic device, and receive contents from the third electronic device based on the response signal, and the information on the first electronic device includes at least one of a type of the first electronic device, a communication scheme of the first electronic device, and a function of the first electronic device.

An operation method for a first electronic device according to an embodiment of the present invention, including: recognizing occurrence of a touch input for transmitting or receiving contents; and transmitting contents to at least one other electronic device or receiving the contents from the at least one other electronic device based on the reception signal strength of a discovery signal or response signal, received from at least one other electronic device.

An operation method for a first electronic device according to an embodiment of the present invention, including: indicating that the transmission of contents to a second electronic device or reception of contents from the second electronic device is possible; and transmitting or receiving the contents to and from the second electronic device through at least one of a first communication unit for low energy communication, a second communication unit for WLAN communication, and a third communication unit for mobile communication based on a discovery signal or a response signal, received from the second electronic device.

An operation method for a first electronic device according to an embodiment of the present invention, including: transmitting information on the first electronic device to a second electronic device connected to the first electronic device; receiving, from the second electronic device, a message requesting transmission, to a third electronic device, of a response signal for a discovery signal transmitted by the third electronic device; transmitting the response signal for the discovery signal received from the third electronic device to the third electronic device; and receiving contents from the third electronic device based on the response signal, wherein the information on the first electronic device includes at least one of a type of the first electronic device, a communication scheme of the first electronic device, and a function of the first electronic device.

DETAILED DESCRIPTION

Hereinafter, the operating principle of the present invention will be described in detail with reference to the accompanying drawings. In describing the present invention below, a detailed description of related known configurations or functions incorporated herein will be omitted when it is determined that the detailed description thereof may unnecessarily obscure the subject matter of the present invention. The terms, which will be described below, are terms defined in consideration of the functions in the present invention, and may be different according to users, intentions of the users, or customs. Therefore, the definitions of the terms should be made based on the contents throughout the specification.

Hereinafter, the present invention will describe a technology for sharing files or contents between different electronic devices.

Figure 1:
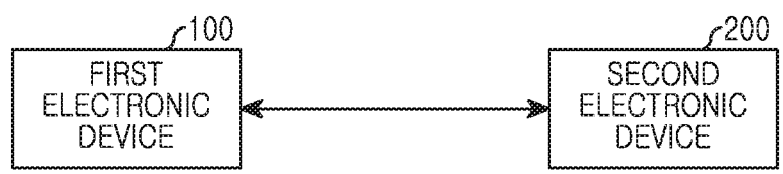
FIG. 1 illustrates an example of a first electronic device 100 and a second electronic device 200 according to an embodiment of the present invention.

FIG. 1 illustrates an example of a first electronic device 100 and a second electronic device 200 according to an embodiment of the present invention.

Referring to FIG. 1, the first electronic device 100 includes a communication means for performing communication with the second electronic device 200. The first electronic device 100 is an electronic device that the user may carry on. For example, the first electronic device 100 may be one of a smart phone, a portable terminal, a mobile phone, a mobile pad, a media player, a tablet computer, a handheld computer, a Personal Digital Assistant (PDA), a wireless controller, and a wearable device, and may be a device that has combined two or more functions of the above described devices.

The second electronic device 200 is a device having a communication function capable of communicating with the first electronic device 100. The second electronic device 200 is an electronic device that may receive contents from the first electronic device 100 and output the received contents. For example, the second electronic device 200 may be one of a smart TV (smart TeleVision), a monitor, a speaker, a woofer, a black box, a wristwatch type terminal, a glasses-type terminal, an electronic device that can be attached to a clothing having a communication function, a camera, a beam projector, Closed Circuit TeleVision (CCTV), a printer, a fax, a three-dimensions (3D) printer, a smartphone, a portable terminal, a mobile phone, a mobile pads, a media player, a tablet computer, a handheld computer, and a PDA, and may be a device that has combined two or more functions of the above described devices.

The communication connection between the first electronic device 100 and the second electronic device 200 may be performed based on at least one of Bluetooth, Bluetooth Low Energy (BLE), Near Field Communication (NFC), Wi-Fi, Wireless Gigabit (WiGig), ZigBee, Ultra WideBand (UWB), Infrared Data Association (IrDA), Visible Light communication (VLC), Global System for Mobile communication (GSM), Enhanced Data GSM Environment (EDGE), Code Division Multiple Access (CDMA), and Long Term Evolution (LTE).

Figure 2:
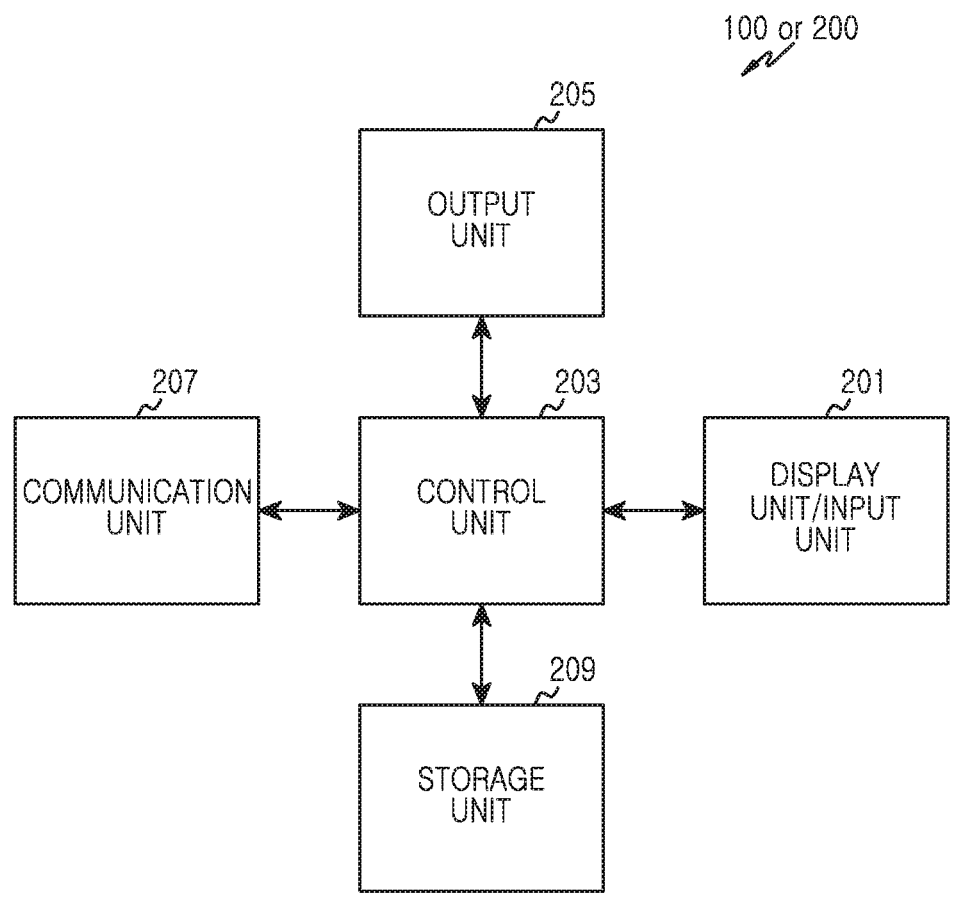
FIG. 2 is a block diagram of a first electronic device 100 or a second electronic device 200 according to an embodiment of the present invention.

FIG. 2 is a block diagram of a first electronic device 100 or a second electronic device 200 according to an embodiment of the present invention.

Referring to FIG. 2, the first electronic device 100 or the second electronic device 200 may include a display unit/input unit 201, a controller 203, an output unit 205, a communication unit 207, and a storage unit 209.

The display unit/input unit 201 may include a touch screen for providing an input/output interface between the electronic device and the user. The display unit/input unit 201 may provide an interface for the user's touch input/output. In detail, the display unit/input unit 201 may be a medium that transmits the user's touch input to the electronic device and displays an output from the electronic device to the user. In addition, the display unit/input unit 201 may provide a visual output to the user. For example, the display unit/input unit 201 may output an image of a device that is recognized by a camera of the electronic device. Such a visual output may appear in the form of a text, a graphic, a video, or a combination thereof. The display/input unit 201 may use various display technologies. For example, Liquid Crystal Display (LCD), Light Emitting Diode (LED), Light emitting Polymer Display (LPD), Organic Light Emitting Diode (OLED), Active Matrix Organic Light Emitting Diode (AMOLED) or Flexible LED (FLED) display technologies may be used.

The controller 203 controls the overall operation of the electronic device. For example, the controller 203 may perform a process and control of voice communication and data communication.

The communication unit 207 performs a function of transmission and reception processing of a wireless signal of data that is input and output through an antenna. For example, for the transmission process, the communication unit 207 performs channel coding of the data to be transmitted, and then performs RF processing of the same, and for the reception process, the communication unit 207 converts the received RF signal into a baseband signal, and performs channel decoding of the baseband signal so as to reconstruct data.

According to an embodiment of the present invention, in addition to a typical function, the display unit/input unit 201 may recognize the occurrence of a touch input for the transmission and reception of the contents. The communication unit 207 may transmit and receive the contents to and from at least one other electronic device on the basis of the strength of at least one reception signal received from the at least one other electronic device.

The communication unit 207 may include a first communication unit for low-power (low energy) communication, a second communication unit for wireless LAN communication, and a third communication unit for mobile communication. For example, the first communication unit may support BLE communication. In addition, the second communication unit may support Wi-Fi communication. The communication unit 207 may receive the at least one reception signal from the at least one other electronic device through the first communication unit. The communication unit 207 may transmit a connection request message to the at least one other electronic device based on the at least one reception signal. The communication unit 207 may establish a communication connection with the at least one other electronic device through the first communication unit or the second communication unit, based on a response message from the at least one other electronic device. When using the second communication unit, the communication unit 207 may transmit information indicating that the first electronic device has an authority for setting the second communication unit.

When the second communication unit is used based on the reception signal, the controller 203 may generate information indicating that the first electronic device 100 has an authority for setting the second communication unit.

The communication unit 207 may transmit, to the at least one other electronic device, at least one discovery signal for discovering the at least one other electronic device, through the first communication unit. The communication unit 207 may receive the at least one reception signal in response to the at least one discovery signal.

The discovery signal may be transmitted according to a predetermined cycle. The discovery signal may be at least one of a communication signal and an acoustic signal of a frequency band other than an audible frequency band. The discovery signal may include at least one of a type of first electronic device 100, a communication scheme that can be supported by the first electronic device 100, a function of the first electronic device 100, a reception signal strength threshold value for the discovery signal, a period for which the discovery signal is transmitted, an interval in which the first electronic device 100 transmits the discovery signal and receives a response signal for the discovery signal, a period of occurrence of intervals in which the response signal is received, information indicating whether the first electronic device 100 plays back contents, information on the contents being played back by the first electronic device 100, information on a service being provided by the first electronic device 100, information on an application running on the first electronic device 100, a threshold value of a reception signal strength according to the contents, a reception signal threshold value according to the service, a reception signal threshold value according to the application, the identification (ID) of the first electronic device 100, a phone number of the first electronic device 100, a list of at least one content which the first electronic device 100 may transmit, a type of each of the at least one content, capacity of each of the at least one transmission content, transmission estimation time of each of the at least one transmission content, the amount of each battery consumption when each of the at least one transmission content is transmitted, the amount of each resource consumption when each of the at least one transmission content is transmitted, and information notifying that the first electronic device 100 has an authority for setting communication scheme of the second communication unit. The threshold value of the reception signal strength may be set to different values depending on contents, services, or applications.

The at least one reception signal may be transmitted based on an interval in which the first electronic device 100 receives the response signal. The at least one reception signal may be at least one of a communication signal and an acoustic signal of a frequency band other than an audible frequency band. The at least one reception signal may include at least one of a type of the at least one other electronic device, a communication scheme that can be supported by the at least one other electronic device, a function of the at least one other electronic device, a reception signal strength threshold value for the reception signal, information indicating whether the at least one other electronic device plays back contents, information on the contents being played back by the at least one other electronic device, information on an application running on the at least one other electronic device, a threshold value of a reception signal strength according to the contents, a reception signal threshold value according to the service, a reception signal threshold value according to the application, the ID of the at least one other electronic device, a phone number of the at least one other electronic device, a list of at least one content which the at least one other electronic device may transmit, a type of each of the at least one content, capacity of each of the at least one content, transmission estimation time of each of the at least one content, the amount of each battery consumption when each of the at least one content is received, and the amount of each resource consumption when each of the at least one content is received.

The communication unit 207 may transmit, to the at least one other electronic device, a response signal for the discovery signal received from the at least one other electronic device through the first communication unit.

The response signal may be transmitted based on an interval in which the first electronic device 100 receives the response signal. The response signal may be at least one of a communication signal and an acoustic signal of a frequency band other than an audible frequency band. The response signal may include at least one of a type of the first electronic device, a communication scheme that can be supported by the first electronic device 100, a function of the first electronic device 100, a reception signal strength threshold value for the discovery signal, a period for which the discovery signal is transmitted, an interval in which the first electronic device 100 transmits the discovery signal and receives a response signal for the discovery signal, a period of occurrence of intervals in which the response signal is received, information indicating whether the first electronic device 100 plays back contents, information on the contents being played back by the first electronic device 100, information on an application running on the first electronic device 100, a threshold value of a reception signal strength according to the contents, a reception signal threshold value according to the service, a reception signal threshold value according to the application, the identification (ID) of the first electronic device 100, a phone number of the first electronic device 100, a list of at least one content which the first electronic device 100 may transmit, a type of each of the at least one transmission content, transmission estimation time of each of the at least one transmission content, the amount of each battery consumption when each of the at least one transmission content is transmitted, the amount of each resource consumption when each of the at least one transmission content is transmitted, and information notifying that the first electronic device 100 has an authority for setting communication scheme of the second communication unit.

The received discovery signal may be one of one or more signals for discovering the at least one other electronic device. The received discovery signal may be transmitted from the at least one other electronic device according to a predetermined cycle. The received discovery signal may be at least one of a communication signal and an acoustic signal of a frequency band other than an audible frequency band. The received discovery signal may include at least one of a type of the at least one other electronic device, a communication scheme that can be supported by the at least one other electronic device, a function of the at least one other electronic device, a threshold value for the reception signal, a period for which the reception signal is transmitted, an interval in which the at least one other electronic device transmits the reception signal and receives a response signal for the reception signal, a period of occurrence of intervals in which the response signal is received, information on the contents being played back by the at least one other electronic device, information on an application running on the at least one other electronic device, a threshold value of a reception signal strength according to the contents, a reception signal threshold value according to the service, a reception signal threshold value according to the application, the ID of the at least one other electronic device, and a phone number of the at least one other electronic device, and the connection response signal may include at least one of a list of at least one content which the at least one other electronic device may transmit, a type of each of the at least one content, capacity of each of the at least one content, transmission estimation time of each of the at least one content, the amount of each battery consumption when each of the at least one content is received, and the amount of each resource consumption when each of the at least one content is received.

The controller 203 may determine the strength of the reception signal. The controller 203 may determine whether the pressure of the touch input for the input unit is equal to or greater than a predetermined pressure value. When the pressure of the touch input is equal to or more than the predetermined pressure value, the controller 203 may determine whether the touch input has been input for a predefined time or more. When the strength of the reception signal is equal to or greater than a threshold value included in the reception signal, and the touch input is maintained for the predefined time or more, the controller 203 may determine whether to transmit or receive contents to or from the at least one other electronic device based on the reception signal.

The controller 203 may determine whether there is a connection history between the at least one other electronic device and the first electronic device 100, based on the at least one of the ID of the at least one other electronic device and a phone number of the at least one other electronic device, which are included in the at least one received discovery signal.

When there is a connection history between the at least one other electronic device and the first electronic device 100, the display unit/input unit 201 may output an indication notifying that the connection with the at least one other electronic device is established. When there is no connection history between the at least one other electronic device and the first electronic device 100, the display unit/input unit 201 may output a User Interface (UI) inquiring, the user of the first electronic device 100, of whether the connection with the at least one other electronic device is established. When an input for accepting the connection with the at least one other electronic device has occurred, the display unit/input unit 201 may output an indication notifying that the connection with the at least one other electronic device is established.

When there is a connection history between the at least one other electronic device and the first electronic device 100, or when an input for accepting the connection with the at least one other electronic device has occurred, the communication unit 207 may transmit a communication connection request message to the at least one other electronic device. The communication unit 207 may establish a communication connection with the at least one other electronic device based on the response message received from the at least one other electronic device.

The controller 203 may determine whether the at least one other electronic device plays back contents based on information on whether the at least one other electronic device plays back the contents.

When the contents are being played back by the at least one other electronic device rather than being played back by the electronic device, the controller 203 may select one other electronic device of the at least one other electronic device based on the strength of the at least one reception signal. The communication unit 207 may make a request for the transmission of a content mirroring signal to the selected one other electronic device. The communication unit 207 may receive the content mirroring signal including information on a time point at which the contents are being played back.

The output unit 205 may output an acoustic signal notifying that the reception of the content mirroring signal from the one other electronic device is possible.

The display unit/input unit 201 may output an indication notifying that the reception of the content mirroring signal from the one other electronic device is possible. The display unit/input unit 201 may output the contents from the time point at which the one other electronic device stops the contents output based on the content mirroring signal received from the one other electronic device. That is, when the contents output from the one other electronic device is stopped, the first electronic device may continuously output the contents.

When the contents are being played back by the first electronic device 100 rather than being played back by the at least one other electronic device and the touch input is terminated, the communication unit 207 may transmit, to the at least one other electronic device, a content mirroring signal including information on a time point at which the playback of the contents by the first electronic device 100 is terminated. The output unit 205 may output an acoustic signal notifying that the content mirroring signal may be transmitted to the at least one other electronic device.

The display unit/input unit 201 may output an indication notifying that the content mirroring signal may be transmitted to the at least one other electronic device. When the content mirroring signal is transmitted to the at least one other electronic device, the display unit/input unit 201 may terminate the output of the contents being played back by the first electronic device.

When the contents are not being played back by the first electronic device 100 and not being played back by the at least one other electronic device, the display unit/input unit 201 may output a list of UIs for contents that can be transmitted and received based on information on contents that can be transmitted by the at least one other electronic device, which are included in the at least one reception signal, and information on contents that can be transmitted, by the first electronic device 100, to the at least one other electronic device.

The communication unit 207 may transmit and receive the selected contents to and from the at least one other electronic device based on the selection of the user for a list of UIs for the contents that can be transmitted and received.

The controller 203 may determine whether the at least one reception signal strength is less than each of the reception signal strength threshold values, based on the reception signal strength threshold values included in each of the at least one signal received from at least one other electronic device which transmits and receives contents to and from the first electronic device 100.

When the at least one reception signal strength is less than each of the reception signal strength threshold values, the display unit/input unit 201 may output an indication notifying that content transmission and reception to and from the at least one other electronic device may be terminated, which transmits at least one signal less than each of the reception signal strength threshold values. The output unit 205 may output an acoustic signal notifying that the content transmission and reception to and from the at least one electronic device, which transmits the signal less than the threshold value, may be terminated.

When the at least one reception signal strength is less than each of the reception signal strength threshold values, based on the reception signal strength threshold values included in each of the at least one reception signal, the communication unit 207 may transmit a message requesting termination of the data transmission and reception to the at least one other electronic device that transmits a signal less than each of the reception signal strength threshold values. The communication unit 207 may terminate the data transmission and reception to and from the at least one other electronic device that transmits a signal less than the threshold value.

When the reception signal strength measured for the at least one reception signal is less than each of the reception signal strength threshold values that corresponds to the at least one reception signal, based on the reception signal strength threshold values included in each of the at least one reception signal, the display unit/input unit 201 may display a UI inquiring a user as to whether to terminate the data transmission and reception to and from the at least one other electronic device that transmits a signal less than each of the reception signal strength threshold values.

When a signal requesting the termination of the contents transmission and reception to and from the at least one electronic device that transmits a signal less than each of the reception signal strength threshold values is received from the user, the communication unit 207 may terminate the content transmission and reception to and from the at least one other electronic device that transmits the signal less than the threshold value.

The communication unit 207 may receive information on a third electronic device connected to a second electronic device. The communication unit 207 may transmit a message requesting a connection with the third electronic device to the second electronic device 200. At this time, the second electronic device 200 may make a request for transmission, to the third electronic device, of a response signal for a discovery signal of the first electronic device 100. The communication unit 207 may transmit the discovery signal to the third electronic device. The communication unit 207 may receive the response signal from the third electronic device. The communication unit 207 may transmit the data to the third electronic device based on the response signal.

The response signal may include at least one of a type of the third electronic device, a communication scheme that can be supported by the third electronic device, a function of the third electronic device, a reception signal strength threshold value for the response signal, a reception signal strength threshold value according to the contents, the ID of the third electronic device, and a phone number of the third electronic device.

According to another embodiment of the present invention, the display unit/input unit 201 may output an indication notifying that content transmission and reception to and from the second electronic device 200 is possible. The output unit 205 may output an acoustic signal notifying that the content transmission and reception to and from the second electronic device 200 is possible. The communication unit 207 may include a first communication unit for low energy communication and a second communication unit for wireless LAN communication. The communication unit 207 may transmit and receive contents to and from the first electronic device 100, through the first communication unit or the second communication unit, based on the reception signal received from the second electronic device 200.

The communication unit 207 may transmit, to the second electronic device 200, at least one discovery signal for discovering the at least one other electronic device, through the first communication unit. The communication unit 207 may receive the reception signal in response to the at least one discovery signal.

The communication unit 207 may transmit a response signal for the reception signal received from the second electronic device 200 to the second electronic device 200 through the first communication unit.

The communication unit 207 may receive a connection request message from the second electronic device 200, and establish a communication connection with the second electronic device 200 through the first communication unit or the second communication unit based on the connection request message.

The display unit/input unit 201 may output a UI for inquiring the user as to whether to connect to the second electronic device 200 based on the connection request message. When an input for accepting the connection from the user is received, the display unit/input unit 201 may output an indication notifying that the connection with the second electronic device 200 is established.

When an input for accepting the connection from the user is received, the output unit 205 may output an acoustic signal notifying that the connection with the second electronic device 200 is established.

When an input for accepting the connection is received from the user, the communication unit 207 may establish the communication connection with the second electronic device 200 through the first communication unit or the second communication unit based on the connection request message.

When receiving, from the second electronic device 200, a message requesting the transmission of the signal for mirroring contents being played back by the first electronic device 100, the display unit/input unit 201 may output an indication notifying that transmission of a signal for mirroring the contents to the second electronic device 200 is possible. The output unit 205 may output an acoustic signal notifying that a signal for mirroring the contents may be transmitted to the second electronic device 200.

The communication unit 207 may transmit, to the second electronic device 200, a content mirroring signal including information on a time point at which the contents playback is terminated.

When the communication unit 207 transmits the content mirroring signal to the second electronic device 200, the display unit/input unit 201 may terminate the output of contents being played back by the first electronic device 100.

When receiving, from the second electronic device 200, a message requesting the transmission of a signal for mirroring contents being played back by the second electronic device 200, the display unit/input unit 201 may output an indication notifying that reception of a signal for mirroring the contents from the second electronic device 200 is possible. The output unit 205 may output an acoustic signal notifying that a signal for mirroring the contents may be received from the second electronic device 200.

The communication unit 207 may receive, from the second electronic device 200, a content mirroring signal including information on a time point at which the contents playback is terminated. The display unit/input unit 201 may output the contents from the time point at which the contents playback by the second electronic device 200 is stopped, based on the content mirroring signal. When receiving, from the second electronic device 200, a transmission request message for at least one content that can be transmitted by the second electronic device 200, the display unit/input unit 201 may output an indication notifying that transmission of the at least one content is possible. The output unit 205 may output an acoustic signal notifying that the at least one content may be transmitted.

The communication unit 207 may transmit the at least one content to the second electronic device 200 based on the transmission request message.

When receiving a message requesting the reception of at least one content from the second electronic device 200, the display unit/input unit 201 may output an indication notifying that the reception of the at least one content is possible. The output unit 205 may output an acoustic signal notifying that reception of the at least one content is possible.

The communication unit 207 may receive the at least one content from the second electronic device 200 based on the message requesting the reception of the at least one content. The communication unit 207 may receive a message requesting termination of data transmission and reception from the second electronic device 200. The communication unit 207 may transmit a response message for the data transmission and reception termination request message to the second electronic device 200, and then terminate the data transmission and reception.

The communication unit 207 may transmit information on the third electronic device connected to the first electronic device 100 to the second electronic device 200. The communication unit 207 may receive, from the second electronic device 200, a message requesting the third electronic device to transmit, to the second electronic device 200, a response signal for a discovery signal transmitted by the second electronic device 200. The communication unit 207 may transmit the message to the third electronic device.

According to still another embodiment of the present invention, the communication unit 207 may transmit information on the first electronic device 100 to the second electronic device 200 connected to the first electronic device 100. The communication unit 207 may receive, from the second electronic device 200, a message requesting transmission, to the third electronic device, of the response signal for the discovery signal transmitted by the third electronic device. The communication unit 207 may transmit, to the third electronic device, a response signal for the discovery signal received from the third electronic device. The communication unit 207 may receive contents from the third electronic device. The output unit 205 may output a signal notifying that reception of the contents from the third electronic device is possible. The output unit 205 may output the contents received from the third electronic device.

According to an embodiment of the present invention, the contents may include music, videos, phone numbers, URL, pictures, documents, and the like. According to another embodiment of the present invention, the communication unit 207 may use at least one of a first communication unit, a second communication unit, and a third communication unit depending on the type of contents to be transmitted and received. For example, when the capacity of the content is smaller than a predetermined reference value, the communication unit 207 may transmit and receive the contents through the first communication unit. For example, when transmitting and receiving video contents, the communication unit 207 may use the second communication unit, and when transmitting and receiving audio contents, the communication unit 207 may use the first communication unit. For example, when the contents are videos, the communication unit 207 may transmit and receive the contents through at least one of the first communication unit, the second communication unit, and the third communication unit according to the resolution of the contents. According to another embodiment of the present invention, the communication unit 207 may transmit and receive the contents through at least one of the first communication unit, the second communication unit, and the third communication unit according to the distance to the at least one other electronic device. For example, when it is located at a short distance from the at least one other electronic device, the communication unit 207 may transmit and receive the contents through at least one of the first communication unit for low energy communication, the second communication unit for a wireless LAN communication, and the third communication unit for a mobile communication. However, when the distance to the at least one other electronic device is spaced apart more than a predetermined reference value, the communication unit 207 may transmit and receive the contents through the third communication unit without using the first communication unit and the second communication unit. According to still another embodiment of the present invention, when the distance to the at least one other electronic device is spaced apart more than a predetermined reference value while transmitting and receiving the contents through the first communication unit or the second communication unit, the communication unit 207 may continuously transmit or receive the contents through the third communication unit. In this case, the communication unit 207 may transmit and receive the address of a content server to and from the at least one other electronic device. For example, the communication unit 207 may receive the contents through the content server, using the address of the content server.

According to still another embodiment of the present invention, the first electronic device 100 and the second electronic device 200 may include a gravity sensor (not shown) and an illumination sensor (not shown). The first electronic device 100 and the second electronic device 200 may determine whether to transmit and receive the contents based on the change in signal detected by the gravity sensor or the illumination sensor. For example, when the first electronic device 100 or the second electronic device 200 is spaced apart more than a predetermined threshold distance from the ground, through a gravity sensor, the first electronic device 100 or the second electronic device 200 may perform an operation for transmitting and receiving the contents being played back by the first electronic device 100 or the second electronic device 200 or the contents that can be transmitted and received by the first electronic device 100 or the second electronic device 200. In addition, when the amount of light detected by the illumination sensor is less than a predetermined reference value, the first electronic device 100 or the second electronic device 200 may perform an operation of transmitting and receiving the contents. For example, when the illumination sensor of the first electronic device 100 or the second electronic device 200 is blocked by the hand of the user of the first electronic device 100 or the second electronic device 200, the first electronic device 100 or the second electronic device 200 may perform an operation for transmitting and receiving the contents. For example, the operation for transmitting and receiving the contents may be an operation of measuring the strength of the signal received from the at least one other electronic device.

Figure 3:
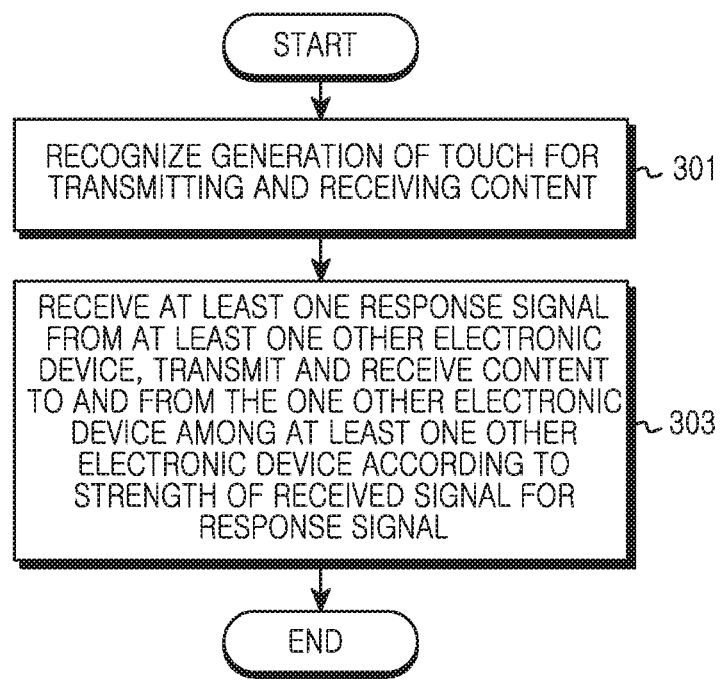
FIG. 3 is a flow chart illustrating an operation of a first electronic device 100 according to an embodiment of the present invention.

FIG. 3 is a flow chart illustrating an operation of a first electronic device 100 according to another embodiment of the present invention.

Referring to FIG. 3, the first electronic device 100 proceeds to step 301, in which the first electronic device recognizes the occurrence of a touch input for transmitting and receiving contents. For example, the first electronic device 100 may determine whether a touch input, by the user, to an input unit of the first electronic device 100 has occurred.

The first electronic device 100 proceeds to step 303, in which the first electronic device transmits and receives contents to and from the at least one other electronic device based on the strength of the at least one reception signal received from the at least one other electronic device. The first electronic device 100 may receive the at least one reception signal from the at least one other electronic device through the first communication unit for low energy communication. The first electronic device 100 may transmit a connection request message to the at least one other electronic device based on the at least one reception signal. The first electronic device 100 may establish a communication connection with the at least one other electronic device through the first communication unit or the second communication unit for low energy communication based on a response message from the at least one other electronic device.

When using the second communication unit, the first electronic device 100 may transmit information indicating that the first electronic device 100 has an authority for setting the second communication unit.

When the second communication unit is used based on the reception signal, the first electronic device 100 may generate information indicating that the first electronic device 100 has an authority for setting the second communication unit.

The first electronic device 100 may transmit, to the at least one other electronic device, at least one discovery signal for discovering the at least one other electronic device, through the first communication unit. The first electronic device 100 may receive at least one response signal in response to the at least one discovery signal.

The discovery signal may be transmitted according to a predetermined cycle. The discovery signal may be at least one of a communication signal and an acoustic signal of a frequency band other than an audible frequency band. The discovery signal may include at least one of a type of first electronic device, a communication scheme that can be supported by the first electronic device, a function of the first electronic device, a reception signal strength threshold value for the discovery signal, a period for which the discovery signal is transmitted, an interval in which the first electronic device transmits the discovery signal and receives a response signal for the discovery signal, a period of occurrence of intervals in which the response signal is received, information indicating whether the first electronic device plays back contents, information on the contents being played back by the first electronic device, information on a service being provided by the first electronic device, information on an application running on the first electronic device, a threshold value of a reception signal strength according to the contents, a reception signal threshold value according to the service, a reception signal threshold value according to the application, the identification (ID) of the first electronic device, a phone number of the first electronic device, a list of at least one content which the first electronic device may transmit, a type of each of the at least one content, the capacity of each of the at least one transmission content, the transmission estimation time of each of the at least one transmission content, the amount of each battery consumption when each of the at least one transmission content is transmitted, the amount of each resource consumption when each of the at least one transmission content is transmitted, and information indicating that the first electronic device has an authority for setting a communication scheme of the second communication unit.

The at least one response signal may be transmitted based on an interval in which the first electronic device receives the response signal. The at least one response signal may be at least one of a communication signal and an acoustic signal of a frequency band other than an audible frequency band. The at least one response signal may include at least one of a type of the at least one other electronic device, a communication scheme that can be supported by the at least one other electronic device, a function of the at least one other electronic device, a reception signal strength threshold value for the reception signal, information indicating whether the at least one other electronic device plays back contents, information a service being provided by the at least one other electronic device, information on an application running on the at least one other electronic device, a threshold value of a reception signal strength according to the contents, a reception signal threshold value according to the service, a reception signal threshold value according to the application, the ID of the at least one other electronic device, a phone number of the at least one other electronic device, a list of at least one content which the at least one other electronic device may transmit, a type of each of the at least one content, the capacity of each of the at least one content, the transmission estimation time of each of the at least one content, the amount of each battery consumption when each of the at least one content is received, and the amount of each resource consumption when each of the at least one content is received.

The first electronic device 100 may transmit, to the at least one other electronic device, a response signal for the discovery signal received from the at least one other electronic device through the first communication unit.

The response signal may be transmitted based on an interval in which the first electronic device receives the response signal. The response signal may be at least one of a communication signal and an acoustic signal of a frequency band other than an audible frequency band. The response signal may include at least one of a type of first electronic device, a communication scheme that can be supported by the first electronic device, a function of the first electronic device, a reception signal strength threshold value for the discovery signal, a period for which the discovery signal is transmitted, an interval in which the first electronic device transmits the discovery signal and receives a response signal for the discovery signal, a period of occurrence of intervals in which the response signal is received, information indicating whether the first electronic device plays back contents, information on the contents being played back by the first electronic device, information on a service being provided by the first electronic device, information on an application running on the first electronic device, a threshold value of a reception signal strength according to the contents, a reception signal threshold value according to the service, a reception signal threshold value according to the application, the identification (ID) of the first electronic device, a phone number of the first electronic device, a list of at least one content which the first electronic device may transmit, a type of each of the at least one content, the capacity of each of the at least one transmission content, the transmission estimation time of each of the at least one transmission content, the amount of each battery consumption when each of the at least one transmission content is transmitted, the amount of each resource consumption when each of the at least one transmission content is transmitted, and information indicating that the first electronic device has an authority for setting a communication scheme of the second communication unit.

The received discovery signal may be one of one or more signals for discovering at least one other electronic device. The received discovery signal may be transmitted according to a predetermined cycle. The received discovery signal may be at least one of a communication signal and an acoustic signal of a frequency band other than an audible frequency band. The received discovery signal may include at least one of a type of the at least one other electronic device, a communication scheme that can be supported by the at least one other electronic device, a function of the at least one other electronic device, a threshold value for the received discovery signal, a period for which the received discovery signal is transmitted, an interval in which the at least one other electronic device transmits the received discovery signal and then receives a response signal for the received discovery signal, a generation period of interval in which the response signal is received, information indicating whether the first electronic device plays back contents, information on the contents being played back by the first electronic device, information on a service being provided by the first electronic device, information on an application running on the electronic device information, a threshold value of a reception signal strength according to the contents, a reception signal threshold value according to the service, a reception signal threshold value according to the application, the ID of the at least one other electronic device, and a phone number of the at least one other electronic device, and the connection response signal may include at least one of a list of at least one content which the at least one other electronic device may transmit, a type of each of the at least one content, the capacity of each of the at least one content, the transmission estimation time of each of the at least one content, the amount of each battery consumption when each of the at least one content is received, and the amount of each resource consumption when each of the at least one content is received.

The first electronic device 100 may determine the strength for the received discovery signal.

The first electronic device 100 may determine whether the touch input is equal to or greater than a predetermined pressure value. When the pressure of the touch input is equal to or more than the predetermined pressure value, the first electronic device 100 may determine whether the touch input is maintained for a predefined time or more. When the strength of the received discovery signal is equal to or greater than a threshold value included in the received discovery signal, and the touch input is maintained for the predefined time or more, the first electronic device 100 may determine whether to transmit and receive the contents to and from the at least one other electronic device based on the received discovery signal.

The first electronic device 100 may determine whether there is a connection history between the at least one other electronic device and the first electronic device, based on the at least one of the ID of the at least one other electronic device and a phone number of the at least one other electronic device, which are included in the at least one received discovery signal.

When there is a connection history between the at least one other electronic device and the first electronic device, the first electronic device 100 may output an indication notifying that the connection with the at least one other electronic device is established.

When there is no connection history between the at least one other electronic device and the first electronic device 100, the first electronic device 100 may output a User Interface (UI) inquiring the user of the first electronic device 100 as to whether the connection with the at least one other electronic device is established. When an input for accepting the connection with the at least one other electronic device has occurred, the first electronic device 100 may output an indication notifying that the connection with the at least one other electronic device is established. When there is a connection history between the at least one other electronic device and the first electronic device or when an input for accepting the connection with the at least one other electronic device has occurred, the first electronic device 100 may transmit a communication connection request message to the at least one other electronic device.

The first electronic device 100 may perform the communication connection with the at least one other electronic device based on the response message received from the at least one other electronic device.

The first electronic device 100 may determine whether the at least one other electronic device plays back contents based on information on the content playback by the at least one other electronic device, which is included in the at least one reception signal.

When the contents are being played back by the at least one other electronic device, the first electronic device 100 may select one other electronic device of the at least one other electronic device based on the strength for the at least one reception signal. The first electronic device 100 may make a request for the transmission of a signal for mirroring the contents to the selected one other electronic device.

The first electronic device 100 may receive a content mirroring signal including information on a time point at which the content playback is terminated. The first electronic device 100 may output an acoustic signal notifying that the reception of the content mirroring signal from the one other electronic device is possible. The first electronic device 100 may output an indication notifying that the reception of the content mirroring signal from the one other electronic device is possible. The first electronic device 100 may continuously output the contents from a time point at which the one other electronic device stops the playback of the contents based on the content mirroring signal received from the one other electronic device.

When the contents are being played back by the first electronic device 100 rather than being played back by the at least one other electronic device and the touch input is terminated, the first electronic device 100 may transmit the content mirroring signal including information on a time point at which the content playback by the first electronic device is stopped.

The first electronic device 100 may output an acoustic signal notifying that the transmission of the content mirroring signal to the at least one other electronic device is possible. The first electronic device 100 may output an indication notifying that the transmission of the content mirroring signal to the at least one other electronic device is possible. When the content mirroring signal is transmitted to the at least one other electronic device, the first electronic device 100 may terminate the playback of the contents being played back by the first electronic device.

When the contents are not being played back by the at least one other electronic device and not being played back by the first electronic device, the first electronic device 100 may output a list of UI for contents that can be transmitted and received based on information on the contents that can be transmitted by the at least one other electronic device, which are included in the at least one reception signal, and information on the contents that can be transmitted, by the first electronic device, to the at least one other electronic device.

The first electronic device 100 may transmit and receive the selected contents to and from the at least one other electronic device based on the selection of the user for a list of UI for the contents that can be transmitted and received.

The first electronic device 100 may determine whether the at least one reception signal is less than each of the reception signal strength threshold values, based on the reception signal strength threshold values included in each of the at least one reception signal received from at least one other electronic device which transmits and receives data to and from the first electronic device 100.

When the at least one reception signal is less than each of the reception signal strength threshold values, the first electronic device 100 may output an indication notifying that data transmission and reception to and from the at least one other electronic device can be terminated, which transmits at least one signal less than each of the reception signal strength threshold values.

The first electronic device 100 may output an acoustic signal notifying that the termination of the data transmission and reception to and from at least one electronic device for transmitting a signal less than the threshold value is possible. The first electronic device 100 may measure the reception signal strength for the received discovery signal based on the reception signal strength threshold value included in each of the at least one received discovery signal. When the strength of the at least one received discovery signal is less than each of the reception signal strength threshold values, the first electronic device 100 may transmit a message requesting the termination of the data transmission and reception to the at least one other electronic device for transmitting a signal less than each of the reception signal strength threshold values. The first electronic device 100 may terminate the data transmission and reception to and from the at least one other electronic device for transmitting a signal less than the threshold value.

When the strength for the at least one received discovery signal is less than each of the corresponding reception signal strength threshold value, based on the reception signal strength threshold value included in each of the at least one received discovery signal, the first electronic device 100 may display a UI inquiring a user as to whether to terminate the content transmission and reception to and from the at least one electronic device that transmits a signal less than each of the reception signal strength threshold values.

When a signal requesting the termination of the content transmission and reception to and from the at least one electronic device that transmits a signal less than the threshold value is received from the user, the first electronic device 100 may terminate the content transmission and reception to and from the at least one electronic device that transmits the signal less than the threshold value.

According to another embodiment of the present invention, the first electronic device 100 may receive information on the third electronic device connected to the second electronic device. The first electronic device 100 may transmit, to the second electronic device, a message requesting the third electronic device to transmit, to the first electronic device, of a response signal for a discovery signal transmitted by the first electronic device. The first electronic device 100 may transmit the discovery signal to the third electronic device, and receive the response signal from the third electronic device.

The first electronic device 100 may transmit the data to the third electronic device based on the response signal. The response signal may include at least one of a type of the third electronic device, a communication scheme that can be supported by the third electronic device, a function of the third electronic device, a reception signal strength threshold value for the response signal, a reception signal strength threshold value according to the contents, the ID of the third electronic device, and a phone number of the third electronic device.

Figure 4:
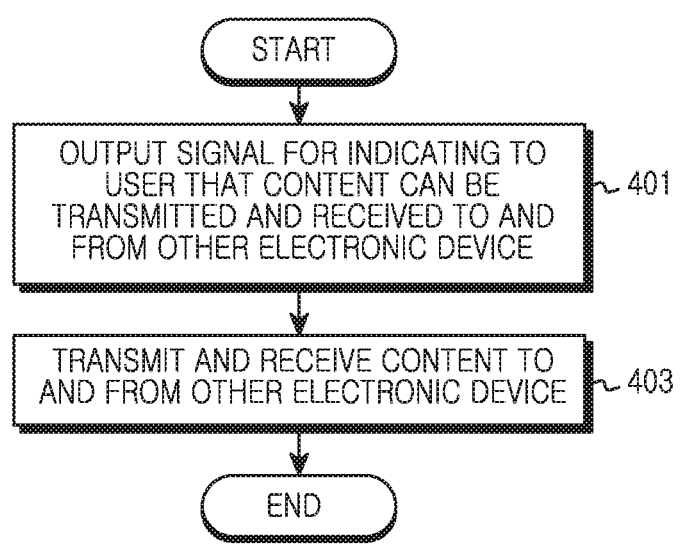
FIG. 4 is a flow chart illustrating an operation of a second electronic device 200 according to an embodiment of the present invention.

FIG. 4 is a flow chart illustrating an operation of a second electronic device 200 according to an embodiment of the present invention.

Referring to FIG. 4, the second electronic device 200 may output at least one of an indication and an acoustic signal notifying that the content transmission and reception to and from the first electronic device 100 is possible. The second electronic device 200 may transmit and receive contents to and from the first electronic device, through a first communication unit for low energy communication or a second communication unit for wireless LAN communication, based on the reception signal received from the first electronic device 100.

The second electronic device 200 may transmit, to the first electronic device 100, at least one discovery signal for discovering the at least one other electronic device through the first communication unit. The second electronic device 200 may receive the reception signal in response to the at least one discovery signal.

The discovery signal may be transmitted according to a predetermined cycle. The discovery signal may be at least one of a communication signal and an acoustic signal of a frequency band other than an audible frequency band. The discovery signal may include at least one of a type of second electronic device 200, a communication scheme that can be supported by the second electronic device 200, a function of the second electronic device 200, a reception signal strength threshold value for the discovery signal, a period for which the discovery signal is transmitted, an interval in which the second electronic device 200 transmits the discovery signal and receives a response signal for the discovery signal, a period of occurrence of intervals in which the response signal is received, information indicating whether the second electronic device 200 plays back contents, information on the contents being played back by the second electronic device 200, information on a service being provided by the second electronic device 200, information on an application running on the second electronic device 200, a threshold value of a reception signal strength according to the contents, a reception signal threshold value according to the service, a reception signal threshold value according to the application, the identification (ID) of the second electronic device 200, a phone number of the second electronic device 200, a list of at least one content which the second electronic device 200 may transmit, a type of each of the at least one content, the capacity of each of the at least one transmission content, the transmission estimation time of each of the at least one transmission content, the amount of each battery consumption when each of the at least one transmission content is transmitted, and the amount of each resource consumption when each of the at least one transmission content is transmitted.

The reception signal may be transmitted based on an interval in which the second electronic device 200 receives the response signal. The reception signal may be at least one of a communication signal and an acoustic signal of a frequency band other than an audible frequency band. The reception signal may include at least one of a type of first electronic device 100, a communication scheme that can be supported by the first electronic device 100, a function of the first electronic device 100, a reception signal strength threshold value for the reception signal, information on contents being played back by the first electronic device 100, information on a service being provided by the first electronic device 100, information on an application running on the first electronic device 100, a threshold value of a reception signal strength according to the contents, a reception signal threshold value according to the service, a reception signal threshold value according to the application, the identification (ID) of the first electronic device 100, a phone number of the first electronic device 100, and the connection response signal may include a list of at least one content which the first electronic device 100 may transmit, a type of each of the at least one content, capacity of each of the at least one transmission content, transmission estimation time of each of the at least one transmission content, the amount of each battery consumption when each of the at least one transmission content is transmitted, the amount of each resource consumption when each of the at least one transmission content is transmitted, and information notifying that the first electronic device 100 has an authority for setting a communication scheme of the second communication unit.

The second electronic device 200 may transmit, to the first electronic device 100, a response signal for the reception signal received from the first electronic device 100 through the first communication unit.

The response signal may be transmitted based on an interval in which the second electronic device receives the response signal. The response signal may be at least one of a communication signal and an acoustic signal of a frequency band other than an audible frequency band. The response signal may include at least one of a type of second electronic device 200, a communication scheme that can be supported by the second electronic device 200, a function of the second electronic device 200, a reception signal strength threshold value for the discovery signal, a period for which the discovery signal is transmitted, an interval in which the second electronic device 200 transmits the discovery signal and receives a response signal for the discovery signal, a period of occurrence of intervals in which the response signal is received, information indicating whether the second electronic device 200 plays back contents, information on a service being provided by the second electronic device 200, information on an application running on the second electronic device 200, a threshold value of a reception signal strength according to the contents, a reception signal threshold value according to the service, a reception signal threshold value according to the application, the identification (ID) of the second electronic device 200, a phone number of the second electronic device 200, a list of at least one content which the second electronic device 200 may transmit, a type of each of the at least one content, the capacity of each of the at least one transmission content, the transmission estimation time of each of the at least one transmission content, the amount of each battery consumption when each of the at least one transmission content is transmitted, and the amount of each resource consumption when each of the at least one transmission content is transmitted.

The reception signal may be one of one or more signals for discovering at least one other electronic device. The reception signal may be transmitted according to a predetermined cycle. The reception signal may be at least one of a communication signal and an acoustic signal of a frequency band other than an audible frequency band. The reception signal may include at least one of a type of the second electronic device, a communication scheme that can be supported by the second electronic device, a function of the second electronic device, a threshold value for the reception signal, a period for which the reception signal is transmitted, an interval in which the second electronic device transmits the reception signal and receives a response signal for the reception signal, a period of occurrence of intervals in which the response signal is received, information on contents being played back by the second electronic device 200, information on a service being provided by the second electronic device 200, information on an application running on the second electronic device 200, a threshold value of a reception signal strength according to the contents, a reception signal threshold value according to the service, a reception signal threshold value according to the application, the ID of the second electronic device, a phone number of the second electronic device, a list of at least one content which the second electronic device may transmit, a type of each of the at least one content, the capacity of each of the at least one content, the transmission estimation time of each of the at least one content, the amount of each battery consumption when each of the at least one content is received, the amount of each resource consumption when each of the at least one content is received, and information indicating that the first electronic device 100 has an authority for setting communication scheme of the second communication unit.

The second electronic device 200 may receive a connection request message from the first electronic device 100. The second electronic device 200 may establish a communication connection with the first electronic device 100 through the first communication unit or the second communication unit based on the connection request message. The second electronic device 200 may output a UI for inquiring the user as to whether to connect with the second electronic device based on the connection request message.

When an input for accepting a connection is received from the user, the second electronic device 200 may output at least one of an indication and an acoustic signal notifying that the connection with the second electronic device is established.

When an input for accepting connection is received from the user, the second electronic device 200 may establish a communication connection with the second electronic device through the first communication unit or the second communication unit based on the connection request message.

When a message requesting transmission of a signal for mirroring contents being played back by the second electronic device 200 is received from the first electronic device 100, the second electronic device 200 may output at least one of an indication and an acoustic signal notifying that the transmission of the signal for mirroring the contents to the first electronic device 100 is possible.

The second electronic device 200 may transmit, to the first electronic device 100, the content mirroring signal including information on a time point at which the content playback is terminated. When the content mirroring signal is transmitted to the first electronic device 100, the second electronic device 200 may terminate the output for the contents being played back by the second electronic device 200.

When a message requesting transmission of a signal for mirroring the contents being played back by the first electronic device 100 is received from the first electronic device 100, the second electronic device 200 may output at least one of an indication and an acoustic signal notifying that the reception of the signal for mirroring the contents from the first electronic device 100 is possible. The second electronic device 200 may receive, from the first electronic device 100, a content mirroring signal including information on a time point at which the content playback is terminated. The second electronic device 200 may output the contents from the time point at which the contents being played back by the second electronic device is terminated, based on the content mirroring signal.

When a transmission request message for at least one content transmittable by the first electronic device 100 is received from the first electronic device 100, the second electronic device 200 may output an indication and an acoustic signal notifying that the transmission of the at least one content is possible. The second electronic device 200 may transmit the at least one content to the first electronic device 100 based on the transmission request message.

When a message requesting the reception of the at least one content from the first electronic device 100 is received, the second electronic device 200 may output at least one of an indication and an acoustic signal notifying that the reception of the at least one content is possible.

The second electronic device 200 may receive the at least one content from the first electronic device 100 based on the message requesting the reception of the at least one content.

The second electronic device 200 may receive the content transmission and reception termination request message from the first electronic device 100. The second electronic device 200 may transmit a response message for the content transmission and reception termination request message to the first electronic device 100, and then terminate the content transmission and reception.

According to another embodiment of the present invention, the second electronic device 200 may transmit information on the third electronic device connected to the first electronic device 100 to the first electronic device 100. The second electronic device 200 may receive, from the first electronic device 100, a message requesting the third electronic device to transmit, to the first electronic device 100, a response signal for a discovery signal transmitted by the first electronic device 100. The second electronic device 200 may transmit the message to the third electronic device.

Figure 5:
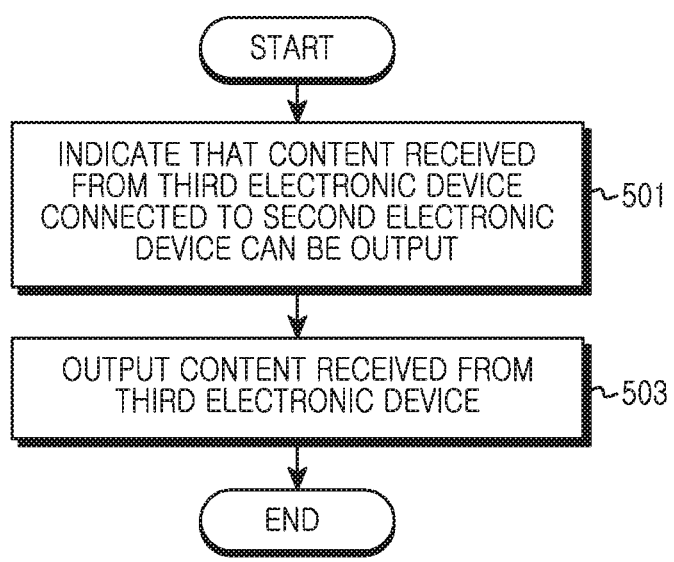
FIG. 5 is a flow chart illustrating an operation of a first electronic device 100 according to another embodiment of the present invention.

FIG. 5 is a flow chart illustrating an operation of a third electronic device according to an embodiment of the present invention.

Referring to FIG. 5, the third electronic device proceeds to step 501, in which the third electronic device notifies that an output of the contents received from the first electronic device 100 connected with the second electronic device is possible. For example, when the output of contents received from the first electronic device 100 is possible, the third electronic device may output an acoustic signal notifying that the contents output is possible. The third electronic device may transmit information on the third electronic device to the second electronic device 200 connected with the third electronic device. The information on the third electronic device may include at least one of a type of the third electronic device, a communication scheme of the third electronic device, and a function of the third electronic device. The third electronic device may receive, from the second electronic device 200, a message requesting transmission, to the third electronic device, of the response signal for the discovery signal transmitted by the first electronic device 100. The third electronic device may transmit the response signal for the discovery signal received from the first electronic device 100 to the first electronic device 100. The third electronic device may receive the contents from the first electronic device.

The third electronic device proceeds to step 503, in which the third electronic device outputs the contents received from the first electronic device 100. For example, the third electronic device may output a video or an acoustic signal received from the first electronic device 100.

Figure 6:
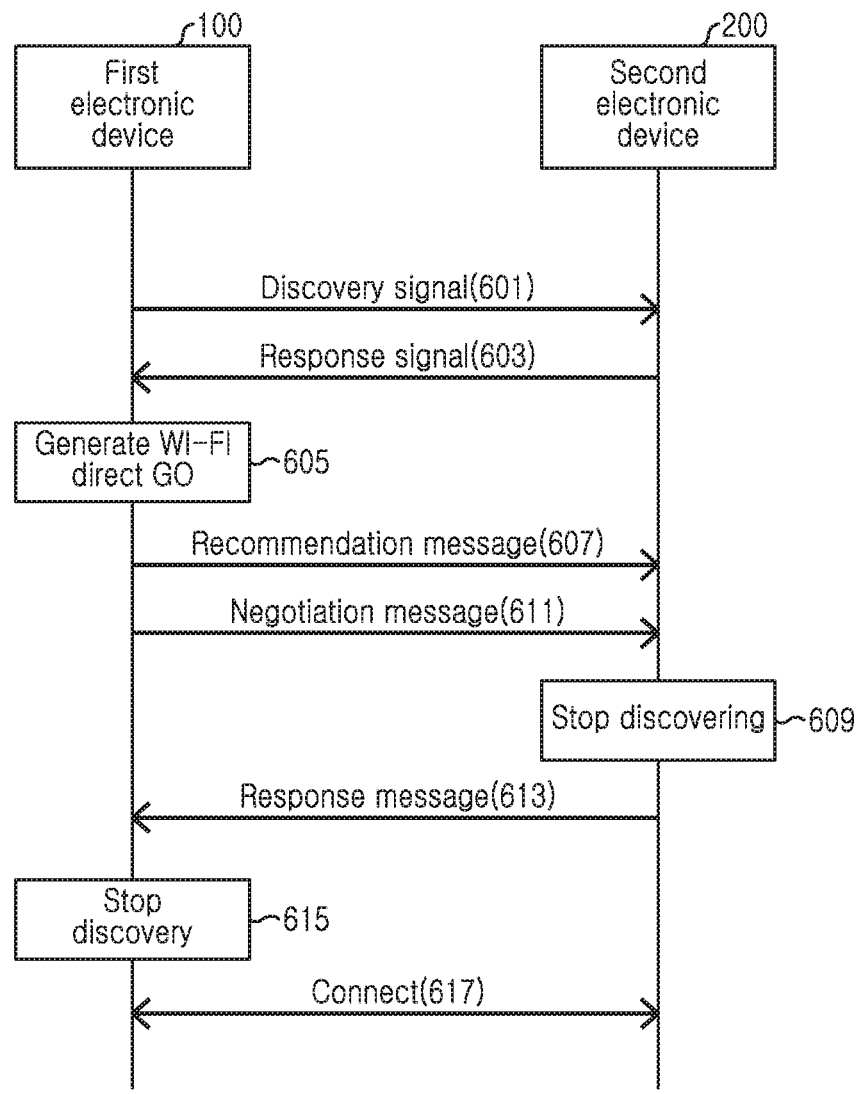
FIG. 6 is a flow diagram of a signal transmitted and received between a first electronic device 100 and a second electronic device 200 according to an embodiment of the present invention.

FIG. 6 is a flow chart illustrating exchanging a signal for a communication connection between a first electronic device 100 and a second electronic device 200 according to an embodiment of the present invention.

Referring to FIG. 6, the second electronic device 200 receives a discovery signal 601, transmitted by the first electronic device 100, for discovering at least one other electronic device. The first electronic device 100 may transmit the discovery signal 601 for periodically discovering the at least one electronic device on the background.

The discovery signal 601 may be transmitted according to a predetermined cycle, and may be at least one of a communication signal and an acoustic signal of a frequency band other than an audible frequency band. The discovery signal 601 may include at least one of a type of first electronic device, a communication scheme that can be supported by the first electronic device, a function of the first electronic device, a reception signal strength threshold value for the discovery signal, a period for which the discovery signal is transmitted, an interval in which the first electronic device transmits the discovery signal and receives a response signal for the discovery signal, a period of occurrence of intervals in which the response signal is received, information on the contents being played back by the first electronic device, a threshold value of a reception signal strength according to the contents, the identification (ID) of the first electronic device, a phone number of the first electronic device, a list of at least one content which the first electronic device may transmit, a type of each of the at least one content, the capacity of each of the at least one transmission content, the transmission estimation time of each of the at least one transmission content, the amount of each battery consumption when each of the at least one transmission content is transmitted, the amount of each resource consumption when each of the at least one transmission content is transmitted, and information indicating that the first electronic device has an authority for setting a communication scheme of the second communication unit.

The second electronic device 200 transmits a response signal 603 for the discovery signal 601 received from the first electronic device 100 to the first electronic device 100.

The response signal 603 may be transmitted based on an interval in which the first electronic device 100 receives the response signal 603. The response signal 603 may be at least one of a communication signal and an acoustic signal of a frequency band other than an audible frequency band. The response signal 603 may include at least one of a type of second electronic device 200, a communication scheme that can be supported by the second electronic device 200, a function of the second electronic device 200, a reception signal strength threshold value for the response signal 603, information on the contents being played back by the second electronic device 200, a threshold value of a reception signal strength according to the contents, the ID of the second electronic device 200, a phone number of the second electronic device 200, a list of at least one content which the second electronic device 200 may transmit, a type of each of the at least one content, the capacity of each of the at least one transmission content, the transmission estimation time of each of the at least one transmission content, the amount of each battery consumption when each of the at least one content is transmitted, and the amount of each resource consumption when each of the at least one content is transmitted.

The first electronic device 100 generates Group Owner (GO) setting information for setting GO for Wi-Fi direct connection based on the response signal 603 (indicated by reference numeral 605). For example, when the first electronic device 100 and second electronic device 200 support a Wi-Fi communication scheme, the first electronic device 100 may generate GO setting information for setting the GO for Wi-Fi direct connection (indicated by reference numeral 605). The Wi-Fi Direct GO means an electronic device that has an authority for setting the Wi-Fi direct among a plurality of electronic devices connected to the Wi-Fi Direct. The first electronic device 100 transmits, to the second electronic device 200, a recommendation message 607 requesting a connection to the second electronic device 200. The recommendation message 607 includes the GO setting information. For example, the recommendation message 607 may include GO setting information indicating that the first electronic device 100 is the GO.

According to another embodiment of the present invention, the discovery signal 601 may include a signal threshold value for determining, by the second electronic device 200, whether the first electronic device 100 is located in a short distance. For example, it may determine whether the first electronic device 100 is located within a distance corresponding to the signal threshold value based on the signal threshold value included in the discovery signal 601 transmitted by the first electronic device 100.

The first electronic device 100 transmits, to the second electronic device 200, a negotiation message 611 for the communication connection with the second electronic device 200 after transmitting the recommendation message 607. The discovery signal 601, the response signal 603, the recommendation message 607, and the negotiation message 611 may be transmitted through a low energy communication unit of each of the first electronic device 100 and the second electronic device 200. When the recommendation message 607 is received from the first electronic device 100, the second electronic device 200 stops the transmission of the discovery signal through the low energy communication unit (indicated by reference numeral 609).

The second electronic device 200 transmits a response message 613 to the first electronic device 100 in response to the negotiation message 611. The first electronic device 100 stops the transmission of the discovery signal that is periodically transmitted after receiving the response message 613. The first electronic device 100 and the second electronic device 200 are connected through the wireless LAN after interchanging the negotiation messages 611 and 613 (indicated by reference numeral 617).

According to an embodiment of the present invention, the first electronic device 100 may generate the GO setting information when transmitting the negotiation message 611 or before transmitting the negotiation message 611. Therefore, the first electronic device 100 may avoid the situation where the connection with the second electronic device 200 is delayed by generating the GO setting information after transmitting the negotiation message 611. That is, the first electronic device 100 may generate the GO setting information when transmitting the negotiation message 611 or before transmitting the negotiation messages 611, so that the first electronic device 100 may be connected with the second electronic device 200 without delay through the wireless LAN, even when the generation of the GO setting information is delayed, by calling a function for removing PBC pop-up after ensuring sufficient time during the time for transmitting the negotiation message 611.

Figure 7A:
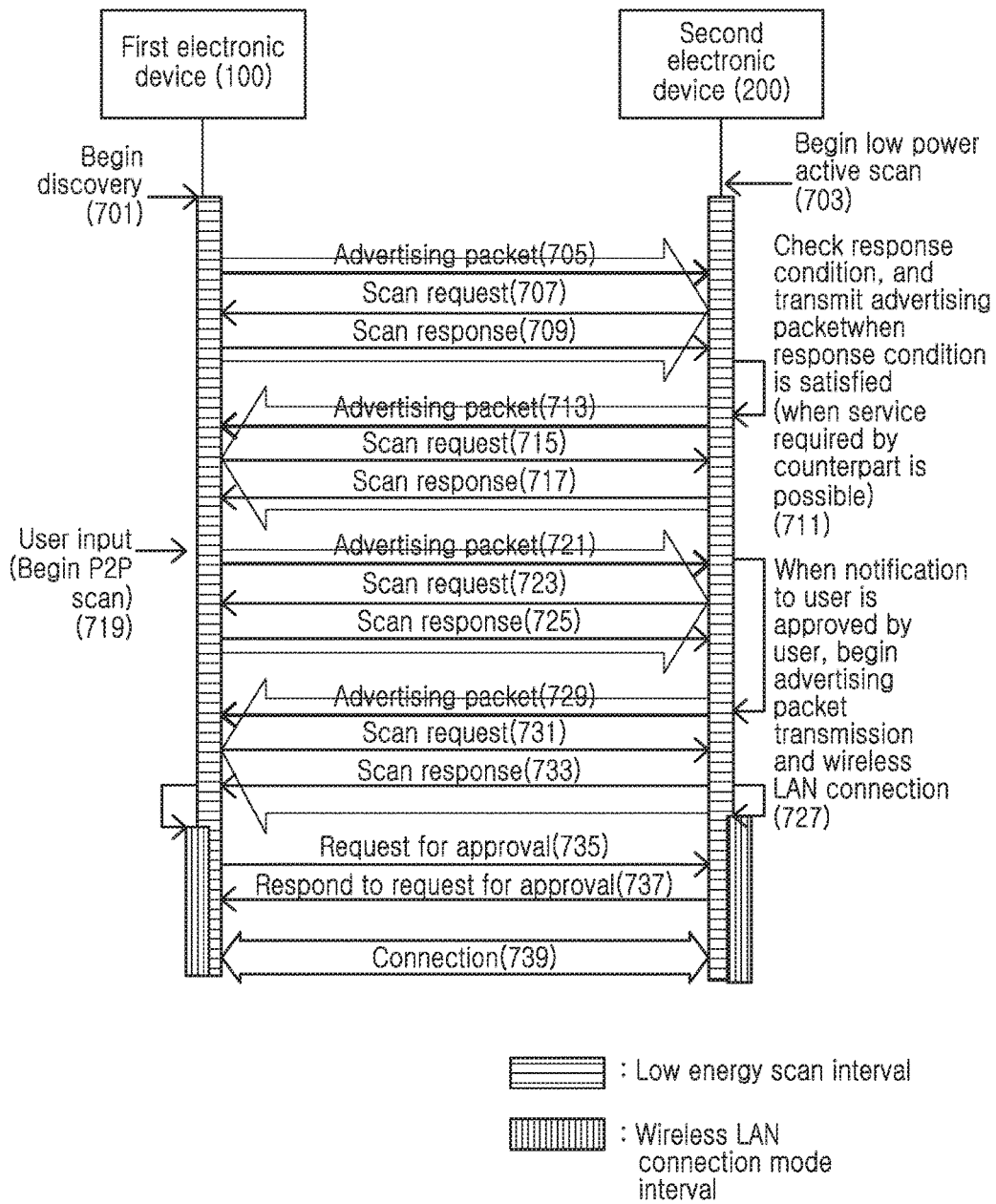
FIG. 7A to 7C are flow charts illustrating an operation of exchanging a signal for discovering a second electronic device 200 through a low energy communication network by a first electronic device 100 according to an embodiment of the present invention.
Figure 7B:
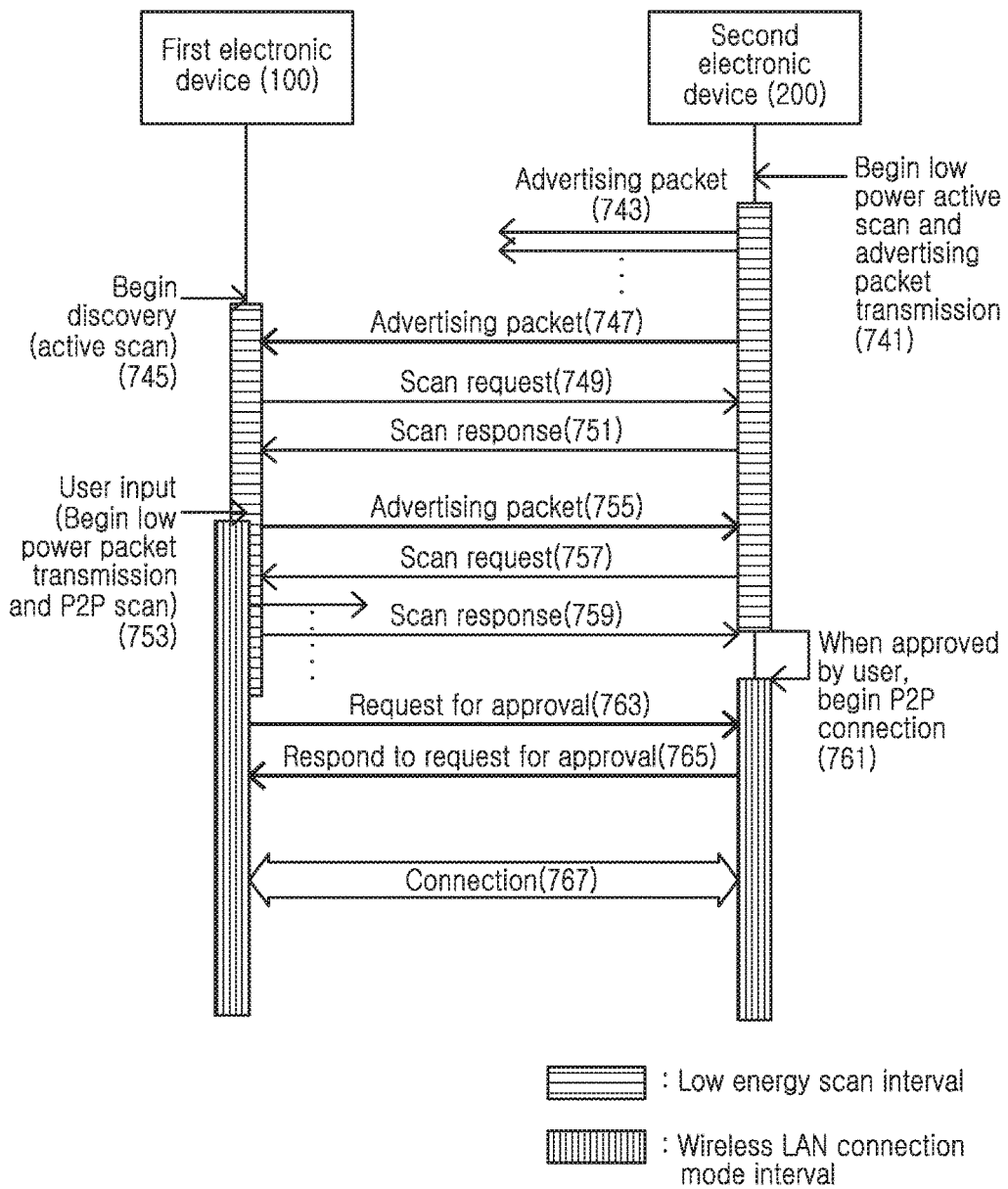
Figure 7C:
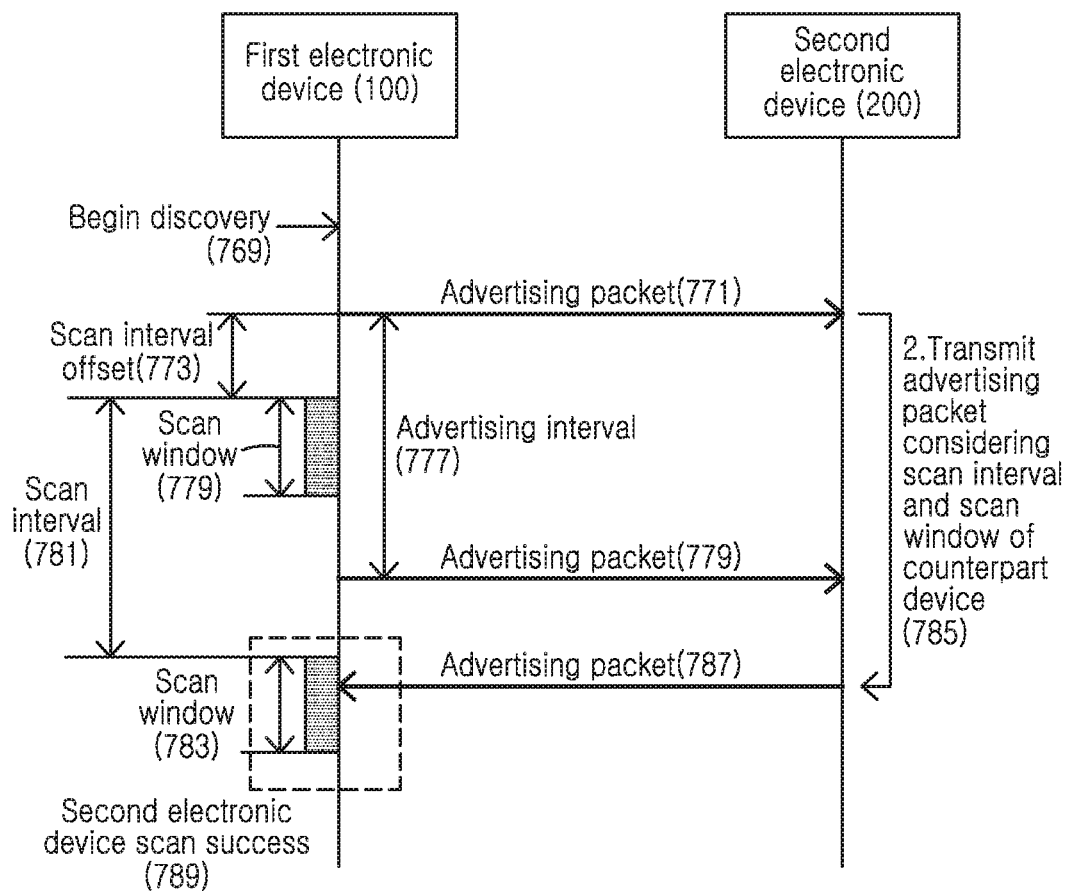

FIGS. 7A to 7C are flow charts illustrating the exchanging of a signal for discovering a second electronic device 200 through a low energy communication network in the first electronic device 100 according to an embodiment of the present invention.

Referring to FIG. 7A, the first electronic device 100 begins a discovery for at least one other electronic device (indicated by reference numeral 701). The first electronic device 100 may begin the discovery (701) when an application requiring interworking with the at least one other electronic device is executed. According to an embodiment of the present invention, the first electronic device 100 may activate a low power communication unit when the discovery begins (701). For example, the first electronic device 100 may activate a BLE module. The second electronic device 200 may activate a low energy communication unit to begin a low power active scan (indicated by reference numeral 703). For example, the second electronic device 200 may activate the BLE module.

The first electronic device 100 transmits an advertising packet 705 to the second electronic device 200 through the low energy communication unit. According to an embodiment of the present invention, the advertising packet 705 may include information that can determine whether the second electronic device 200 can interwork with the first electronic device 100. For example, the advertising packet 705 may include information on a function of the first electronic device 100. The advertising packet 705 may include a message requesting the second electronic device 200 to transmit an advertising packet to the first electronic device 100 when the second electronic device 200 can interwork with the first electronic device 100.

The second electronic device 200 transmits a scan request message 707 to the first electronic device 100 after receiving the advertising packet 705 through the low energy communication unit. The first electronic device 100 transmits a scan response message 709 to the second electronic device 200 in response to the scan request message 707.

The second electronic device 200 checks a response condition included in the advertising packet 705 (indicated by reference numeral 711). For example, the second electronic device 200 may check the function information of the first electronic device 100, which is included in the advertising packet 705. The second electronic device 200 may determine whether the second electronic device 200 can interwork with the first electronic device 100 through the function information. For example, the second electronic device 200 may determine whether the contents played back by the first electronic device 100 can be mirrored through the function information.

When the second electronic device 200 and the first electronic device 100 can interwork with each other, the second electronic device 200 transmits an advertising packet 713 to the first electronic device 100. The first electronic device 100 receives the advertising packet 710 from the second electronic device 200 and transmits a scan request message 715 to the second electronic device 200. The second electronic device 200 transmits a scan response message 717 to the first electronic device 100 in response to the scan request message 715. The first electronic device 100 may display a UI for notifying a user that the second electronic device 200 can interwork with the first electronic device 100.

When the user input is generated, the first electronic device 100 begins a Peer to Peer (P2P) scan (indicated by reference numeral 719). For example, the first electronic device 100 transmits an advertising packet 721 to the second electronic device 200 when the touch input by the user on the touch screen of the first electronic device 100 is recognized. According to an embodiment of the present invention, the advertising packet 721 may include a message requesting a connection through a wireless LAN. For example, the advertising packet 721 may include a message requesting a connection through the Wi-Fi scheme with the first electronic device 100. The second electronic device 200 receives the advertising packet 721 and transmits a scan request message 723 to the first electronic device 100. The first electronic device 100 transmits a scan response message 725 to the second electronic device 200 in response to the scan request message 723.

After receiving the advertising packet 721, the second electronic device 200 notifies a user that a connection through the wireless LAN is requested from the first electronic device 100 (indicated by reference numeral 727). For example, the second electronic device 200 may display a UI for inquiring the user as to whether to connect to the first electronic device 100 through the wireless LAN. The second electronic device 200 transmits an advertising packet 729 to the first electronic device 100 when the user input for approving a connection with the first electronic device 100 through the wireless LAN is generated. The advertising packet 729 may include a message notifying that the second electronic device 200 has approved a connection with the first electronic device 100 through the wireless LAN. The first electronic device 100 receives the advertising packet 729 and transmits a scan request message 731 to the second electronic device 200. The second electronic device 200 transmits a scan response message 733 to the first electronic device 100 in response to the scan request message 731.

The first electronic device 100 transmits an approval request message 735 to the second electronic device 200 through the wireless LAN. The second electronic device 200 transmits an approval response message 737 to the first electronic device 100 in response to the approval request message 735. At this time, the first electronic device 100 and the second electronic device 200 are connected through the wireless LAN (indicated by reference numeral 739).

Referring to FIG. 7B, the second electronic device 200 according to another embodiment of the present invention begins a low energy active scan and an advertising packet transmission when a low energy communication unit is activated by the user input (indicated by reference numeral 741). For example, when the user activates the BLE module of the second electronic device 200, the second electronic device 200 transmits an advertising packet 743 according to a predetermined cycle.

The first electronic device 100 according to an embodiment of the present invention begins a discovery for at least one other electronic device when an application requiring P2P communication is executed (indicated by reference numeral 745). At this time, the first electronic device 100 receives the advertising packet 747 transmitted by the second electronic device 200. According to an embodiment of the present invention, the advertising packet 747 may include information on the function of the second electronic device 200 and information on a communication scheme that the second electronic device 200 can support. For example, when the second electronic device 200 is a smart phone capable of supporting Wi-Fi communication, the advertising packet 747 may include information indicating that the second electronic device 200 can support Wi-Fi communication and has a function of outputting video and audio. The first electronic device 100 transmits a scan request message 749 to the second electronic device 200. The second electronic device 200 transmits a scan response message 751 to the first electronic device 100 in response to the scan request message 749.

The first electronic device 100 may determine whether the second electronic device 200 can interwork with the first electronic device 100 through the advertising packet 747 received from the second electronic device 200. For example, the first electronic device 100 may determine whether the second electronic device 200 can mirror the contents played back by the first electronic device 100. In addition, the first electronic device 100 may check a communication scheme connectable with the second electronic device 200.

According to an embodiment of the present invention, the first electronic device 100 may display a UI for notifying a user that the second electronic device 200 can interwork with the first electronic device 100.

The first electronic device 100 begins a low energy advertising packet transmission and a P2P scan when an input from the user is detected (indicated by reference numeral 753). For example, the first electronic device 100 transmits an advertising packet 755 to the second electronic device 200 when the touch input of the user on the touch screen of the first electronic device 100 is detected. According to an embodiment of the present invention, the advertising packet 755 may include a message requesting a connection to the second electronic device 200 through the wireless LAN. At this time, the first electronic device 100 may activate the wireless LAN module. The second electronic device 200 transmits a scan request message 757 to the first electronic device 100. The first electronic device 100 transmits a scan response message 759 to the second electronic device 200 in response to the scan request message 757.

The second electronic device 200 may display a UI for inquiring the user as to whether to connect to the first electronic device 100 through the wireless LAN. The second electronic device 200 begins a P2P connection when the user input for approving a connection with the first electronic device 100 through the wireless LAN is generated (indicated by reference numeral 761). For example, the second electronic device 200 may activate the wireless LAN module. The first electronic device 100 may transmit an approval request message according to a predetermined cycle through the wireless LAN module of the first electronic device 100.

The second electronic device 200 receives an approval request message 763 transmitted by the first electronic device 100. The second electronic device 200 transmits an approval response message 765 to the first electronic device 100 in response to the approval request message 763. When the above-described signal exchange is completed, the first electronic device 100 and the second electronic device 200 are connected through the wireless LAN (indicated by reference numeral 767).

Referring to FIG. 7C, the first electronic device 100 according to another embodiment of the present invention begins a discovery for at least one other electronic device (indicated by reference numeral 769). For example, the first electronic device 100 may begin a discovery for the at least one other electronic device when executing an application capable of interworking with the at least one other electronic device. The first electronic device 100 transmits an advertising packet 771 to the second electronic device 200 through the low energy communication unit. The advertising packet 771 according to an embodiment of the present invention may include information on a scan offset interval 773, a scan window period 775, an advertising packet transmission interval 777, and a scan interval 781 of the first electronic device 100.

The second electronic device 200 may check information on the scan offset interval 773, the scan window period 779, the advertising packet transmission interval 777, and the scan interval 781 of the first electronic device 100 through the advertising packet 771. The second electronic device 200 may transmit an advertising packet based on the scan interval 781, and the scan window periods 779 and 783 of the first electronic device 100. For example, the second electronic device 200 transmits an advertising packet 787 for a scan window period 783 of the first electronic device 100 based on the scan interval 781, and the scan window periods 779 and 783 of the first electronic device 100. The first electronic device 100 transmits the advertising packet 787 for the scan window period 783 so as to scan the second electronic device 200 (indicated by reference numeral 789).

The advertising packet 771 according to another embodiment of the present invention may not include information on the scan offset interval 773, the scan window period 779, the advertising packet transmission interval 777, and the scan interval 781 of the first electronic device 100. At this time, the second electronic device 200 may infer the scan window period 783 of the first electronic device 100 based on the period for which the advertising packets 771 and 787 are transmitted from the first electronic device 100. The first electronic device 100 and the second electronic device 200 may know relevant information in advance so that the scan window period 783 can be inferred. For example, information promised when a product is produced can be used, or the information can be provided and used through software update. Alternatively, a connection history between conventional devices can be stored and reused. The second electronic device 200 may transmit the advertising packet 787 to the first electronic device 100 in compliance with the inferred scan window period 783 of the first electronic device 100.

Figure 8A:
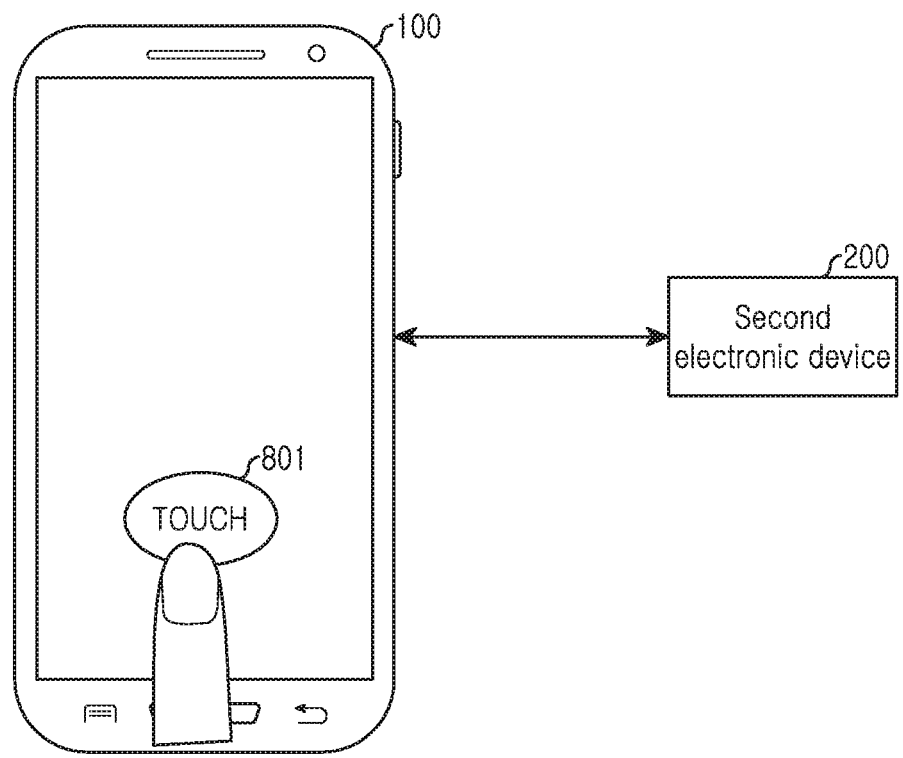
FIG. 8A to FIG. 8C are examples of transmitting and receiving a file or content mirroring signal between a first electronic device 100 and a second electronic device 200 according to an embodiment of the present invention.
Figure 8B:
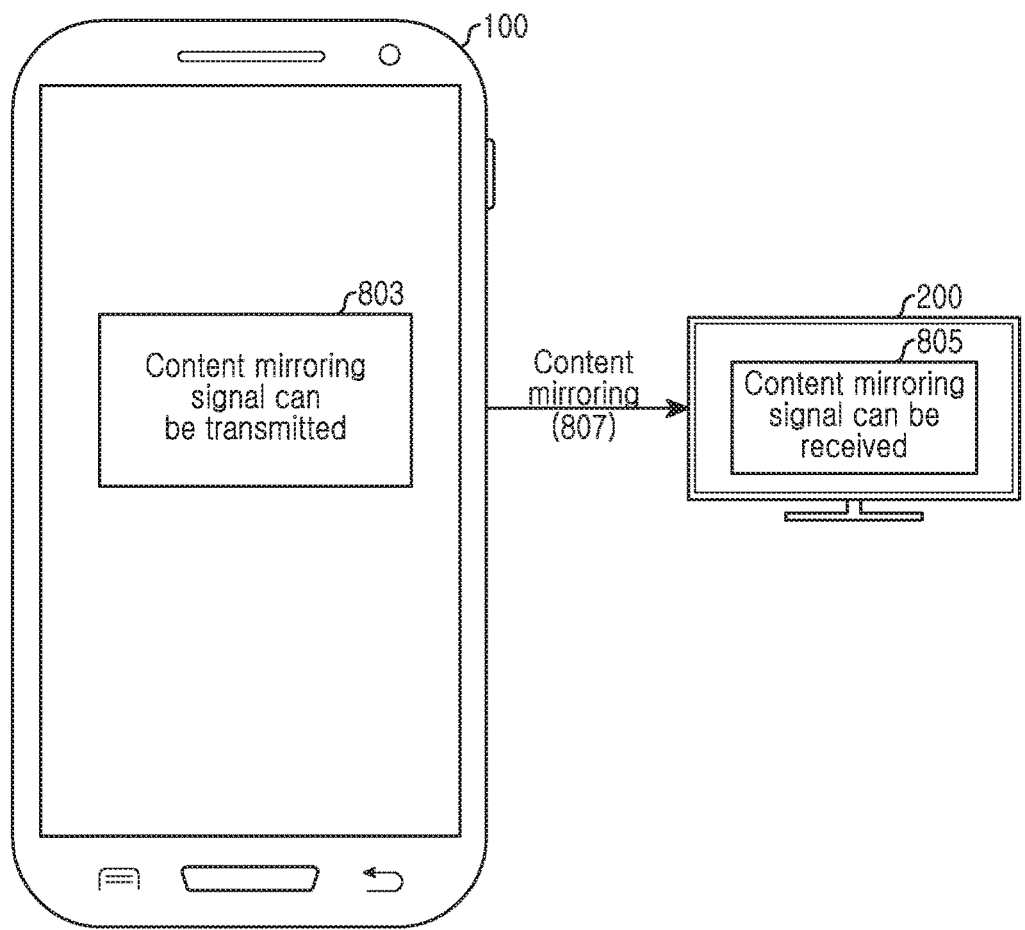
Figure 8C:
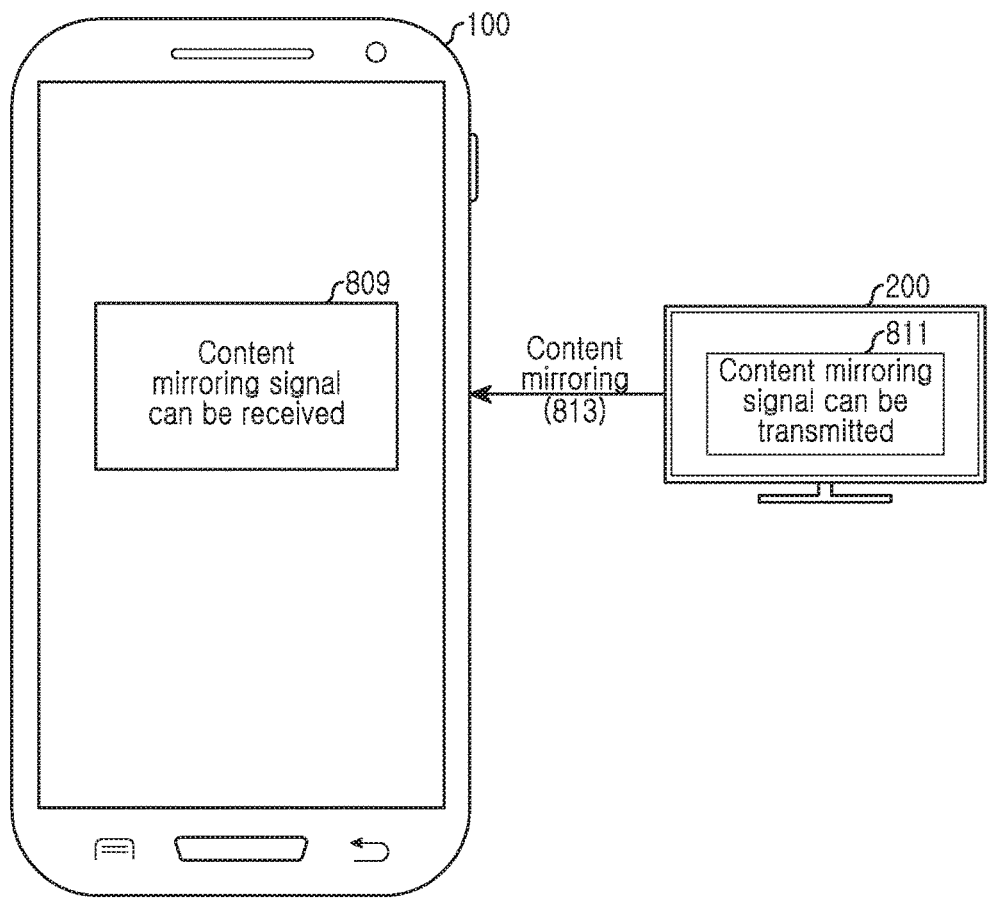

FIG. 8A to FIG. 8C illustrate an example of mirroring contents between a first electronic device 100 and a second electronic device 200 according to an embodiment of the present invention.

Referring to FIG. 8A, the first electronic device 100 may output, to the second electronic device 200, an indication that the first electronic device 100 can mirror contents being played back by itself. For example, when it is recognized that the user of the first electronic device 100 touches (indicated by reference numeral 801) on the touch screen of the first electronic device 100, which is playing back the contents, with pressure equal to or greater than a predetermined criterion and for a time equal to or more than a predetermined criterion, the first electronic device 100 may display a message indicating that the contents can be mirrored to the second electronic device 200.

Referring to FIG. 8B, when the user moves the first electronic device 100 near the second electronic device 200 while touching the touch screen, the first electronic device 100 may measure the strength of a signal received from the second electronic device 200. At this time, when the strength of a signal received from the second electronic device 200 exceeds a predetermined threshold value, the first electronic device 100 may transmit a message requesting the reception of content mirroring signal to the second electronic device 200.

The second electronic device 200 may notify that the second electronic device 200 can receive a content mirroring signal from the first electronic device 100 in response to the request message of the first electronic device 100 (indicated by reference numeral 805). For example, the second electronic device 200 may blink a screen of the second electronic device 200 or output an acoustic signal to allow the user to recognize that the second electronic device 200 can receive the content mirroring signal. At this time, when the user terminates touching of the touch screen of the first electronic device 100, the first electronic device 100 may transmit the content mirroring signal to the second electronic device 200 (indicated by reference numeral 807). When the user does not terminate touching of the touch screen of the first electronic device 100 within a predetermined time, the first electronic device 100 may determine that the user does not want to share the contents with the second electronic device 200, so as not to display an indication notifying that the contents displayed on the touch screen of the first electronic device 100 can be mirrored. In addition, the first electronic device 100 may stop the display for indicating that the second electronic device 200 may also receive the content mirroring signal. That is, when the user of the first electronic device 100 does not want to share contents with the second electronic device 200, the user may not terminate touching of the touch screen of the first electronic device 100.

According to another embodiment of the present invention, when the user moves away from the second electronic device 200 while touching the touch screen of the first electronic device 100 that is mirroring the contents to the second electronic device 200, the first electronic device 100 may perform an operation of terminating the content mirroring to the second electronic device 200. For example, when the user moves away from the second electronic device 200 while touching the touch screen of the first electronic device 100, the first electronic device 100, which is mirroring the contents to the second electronic device 200, may measure the strength of a signal received from the second electronic device 200. The first electronic device 100 may display, on a display unit of the first electronic device 100, an indication that content mirroring to the second electronic device 200 can be terminated and the connection to the second electronic device 200 is released when the strength of a signal received from the second electronic device 200 exceeds a predetermined threshold. At this time, when the user terminates touching of the touch screen of the first electronic device 100, the first electronic device 100 may terminate the content mirroring to the second electronic device 200 and release the connection thereto. According to still another embodiment of the present invention, an indication that the content mirroring can be terminated and the connection is released may not be displayed on the first electronic device 100. According to another embodiment of the present invention, the first electronic device 100 may output the contents from a time point at which the content mirroring to the second electronic device 200 is terminated. For example, when the first electronic device 100 mirrors a sound content to the second electronic device 200, the sound content may not be output from the first electronic device 100, and the sound content may be output from the second electronic device 200 that has received the sound content mirroring signal. At this time, when the connection with the second electronic device 200 is terminated, the first electronic device 100 may output the sound content from a time point at which the connection is terminated, through the output unit of the first electronic device 100.

According to still another embodiment of the present invention, the first electronic device 100 may transmit the content mirroring signal to an audio or speaker device having a function of communicating with the first electronic device 100. For example, the first electronic device 100 may mirror, to the audio or speaker device, the audio signal that can be output by the audio or speaker device. The audio or speaker device may receive a mirroring signal from the first electronic device 100 and output the audio signal.

Referring to FIG. 8C, according to still another embodiment of the present invention, the first electronic device 100 may receive a file from the second electronic device 200 or receive a content mirroring signal. For example, when the user moves the first electronic device 100 near the second electronic device 200 while touching the touch screen, the first electronic device 100 may measure the strength of a signal received from the second electronic device 200. At this time, when the strength of a signal received from the second electronic device 200 exceeds a predetermined threshold value, the first electronic device 100 may transmit a message requesting the transmission of content mirroring signal to the second electronic device 200.

The second electronic device 200 may notify that the second electronic device 200 can transmit the content mirroring signal to the first electronic device 100 in response to the request message of the first electronic device 100. For example, the second electronic device 200 may output an indication notifying that content mirroring signal can be transmitted (indicated by reference numeral 811). For example, the second electronic device 200 may blink a screen of the second electronic device 200 or output an audio signal to allow the user to recognize that the second electronic device 200 can transmit the content mirroring signal. Similarly, the first electronic device 100 may output an indication notifying that the content mirroring signal can be received (indicated by reference numeral 809). For example, the first electronic device 100 may blink a screen of the first electronic device 100 or output an audio signal to allow the user to recognize that the first electronic device 100 can receive the content mirroring signal.

At this time, when the user terminates touching of the touch screen of the first electronic device 100 after the first electronic device 100 has moved a predetermined distance or more from the second electronic device 200, the content mirroring signal may be transmitted to the first electronic device 100 (indicated by reference numeral 813).

According to another embodiment of the present invention, when the user moves away from the second electronic device 200 while touching the touch screen of the first electronic device 100 that is receiving the content mirroring signal from the second electronic device 200, the second electronic device 200 may perform an operation of terminating the content mirroring signal transmission to the first electronic device 100. For example, when the user of the first electronic device 100 moves away from the second electronic device 200, the second electronic device 200, which is transmitting the content mirroring signal to the first electronic device 100, may measure the strength of a signal received from the first electronic device 100. When the strength of the signal received from the first electronic device 100 exceeds a predetermined threshold value, the second electronic device 200 may terminate the transmission of the content mirroring signal to the first electronic device 100, and continuously output the contents to the screen display unit of the second electronic device 200 from a time point at which the content mirroring is terminated.

According to still another embodiment of the present invention, the second electronic device 200 may transmit the content mirroring signal to an audio or speaker device having a function of communicating with the first electronic device 100. For example, the second electronic device 200 may mirror, to the audio or speaker device, the audio signal that can be output by the audio or speaker device. The audio or speaker device may receive a mirroring signal from the second electronic device 200 and output the audio signal.

FIG. 9A to FIG. 9D are examples of transmitting and receiving a file or content mirroring signal between a first electronic device 100 and a second electronic device 200 according to another embodiment of the present invention.

Figure 9A:
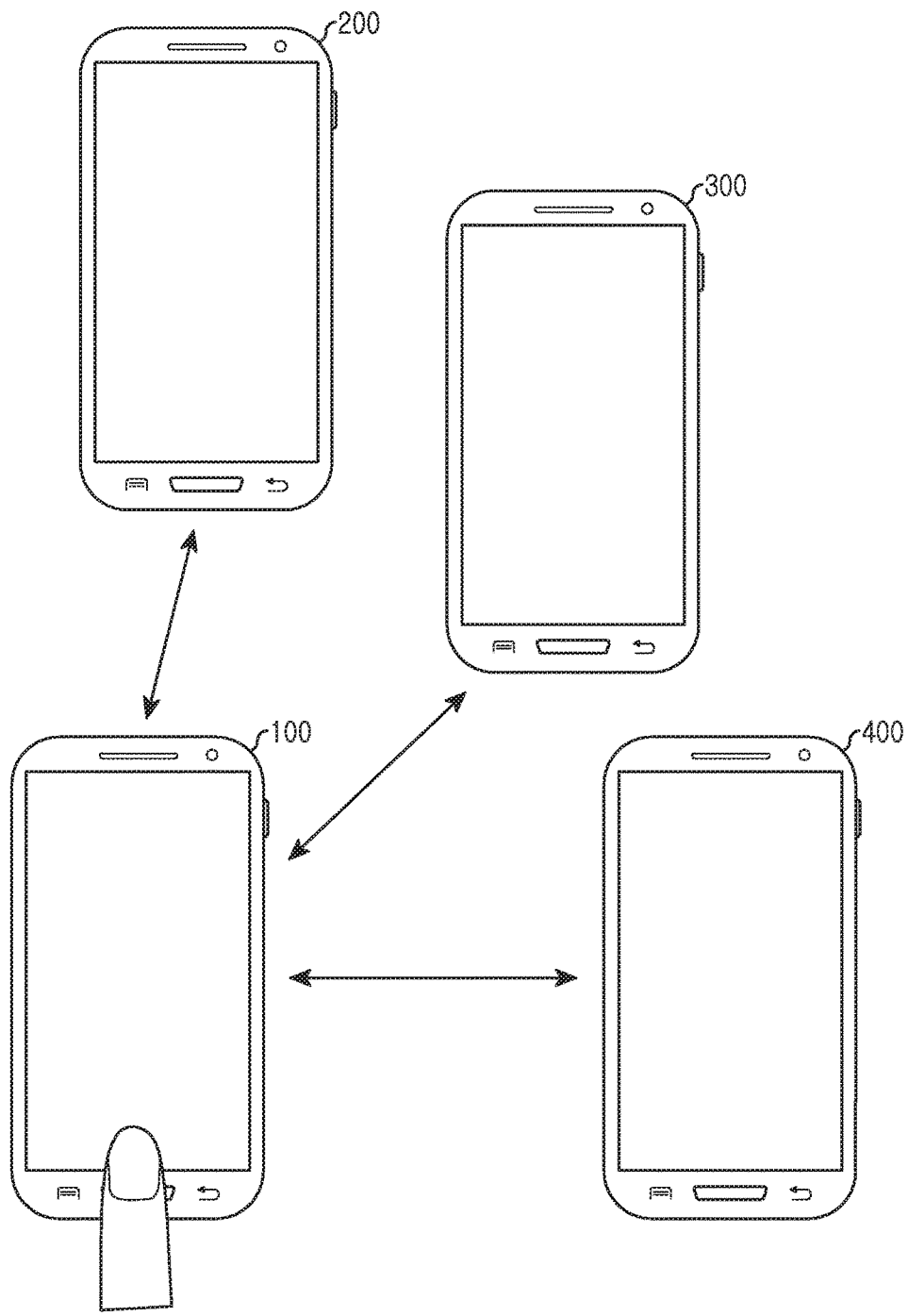
FIG. 9A to FIG. 9D are examples of transmitting and receiving a file or content mirroring signal between a first electronic device 100 and a second electronic device 200 according to another embodiment of the present invention.

Referring to FIG. 9A, a user of the first electronic device 100 may transmit a file from the first electronic device 100 to at least one of a second electronic device 200, a third electronic device 300, and a fourth electronic device 400. For example, a user of the first electronic device 100 may select a file for transmitting from the first electronic device 100 to the at least one electronic device, and then touch the touch screen of the first electronic device 100. At this time, when a touch input is performed with pressure equal to or greater than a predetermined criterion and for a time equal to or more than a predetermined criterion, the first electronic device 100 may display, on the touch screen of the first electronic device 100, a message indicating that the file can be transmitted. When the user moves the first electronic device 100 closer to one of the second electronic device 200 to fourth electronic device 400 while touching the touch screen of the first electronic device 100, the first electronic device 100 may transmit a message for file transmission to the one electronic device that is close to the first electronic device 100 among the second electronic device 200 to fourth electronic device 400. For example, when the user moves the first electronic device 100 closer to the second electronic device 200, the first electronic device 100 may transmit a message for file transmission to the second electronic device 200.

Figure 9B:
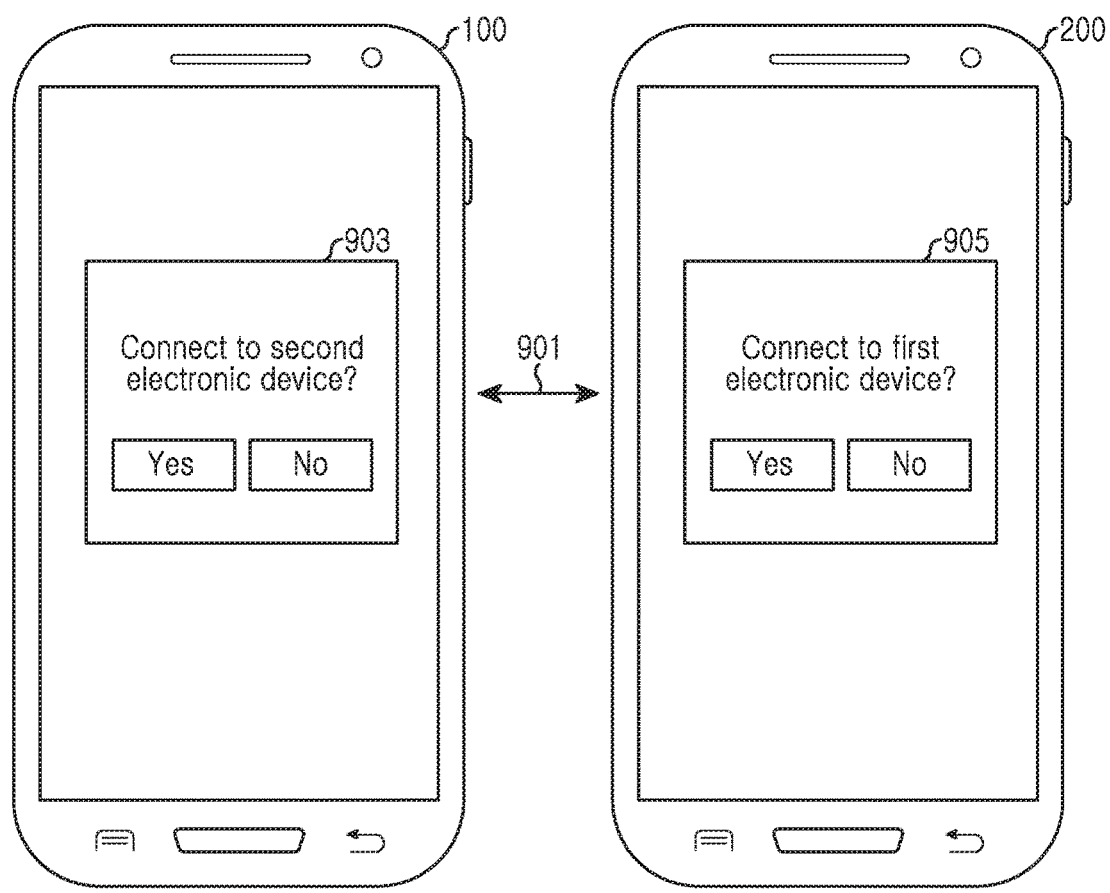

Referring to FIG. 9B, when the user moves the first electronic device 100 closer to the second electronic device 200 while touching the touch screen of the first electronic device 100 in a state where a message indicating that the file can be transmitted to the first electronic device 100 is displayed, the first electronic device 100 may recognize that the strength of a signal received from the second electronic device 200 is rapidly changed. The first electronic device 100 may display, on the first electronic device 100, a UI 903 for inquiring, to the user of the first electronic device 100, as to whether to connect with the second electronic device 200. In addition, the second electronic device 200 may display, on the second electronic device 200, a UI 905 inquiring the user of the second electronic device 200 as to whether to connect with the first electronic device 100. For example, when the first electronic device 100 and the second electronic device 200 are not electronic devices registered with each other, the first electronic device 100 may display the UI 903 for inquiring the user of the first electronic device 100 as to whether to connect with the second electronic device 200. In addition, the second electronic device 200 may display the UI 905 that inquires the user of the second electronic device 200 as to whether to connect with the first electronic device 100. For example, the criterion for determining whether the registered electronic device is the registered electronic device is determined based on at least one of whether a phone number of the second electronic device 200 is registered in the telephone directory of the first electronic device 100, whether the first electronic device 100 and the second electronic device 200 have a call history, whether the first electronic device 100 and the second electronic device 200 have a communication connection, and the like.

According to an embodiment of the present invention, when the first electronic device 100 and the second electronic device 200 are mutually registered electronic devices, the first electronic device 100 and the second electronic device 200 may not display the UI 903 and 905 for inquiring a user as to whether to connect therebetween.

Figure 9C:
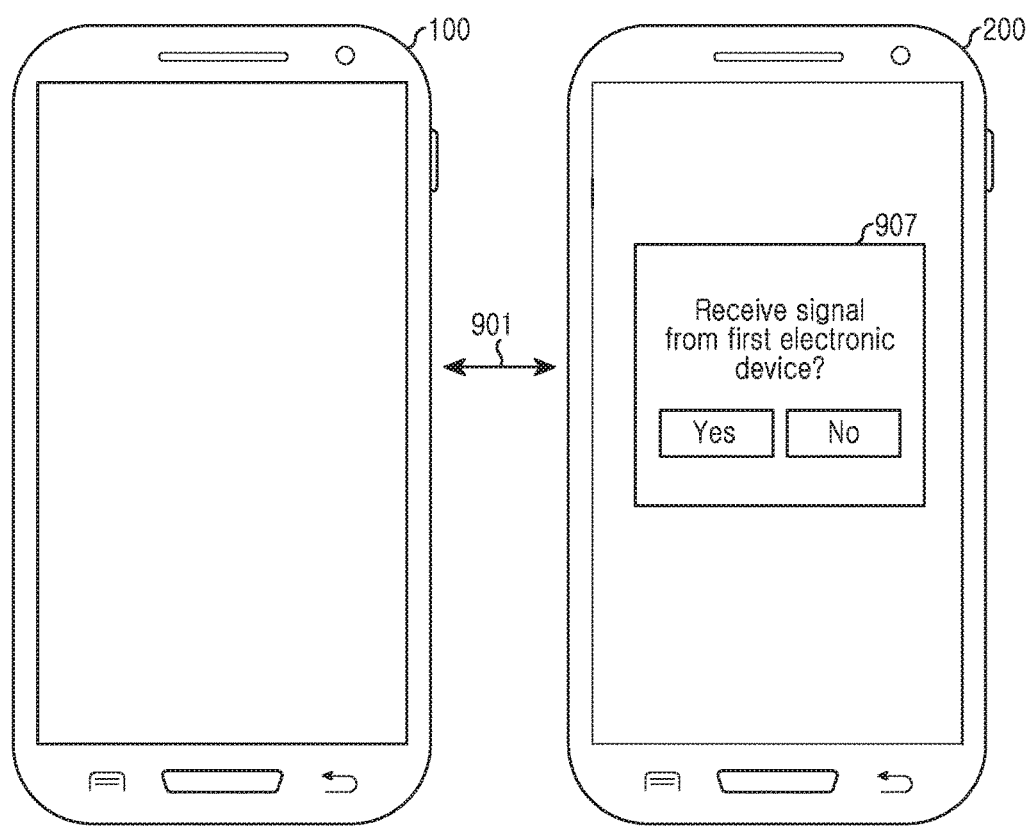

Referring to FIG. 9C, when the user of the first electronic device 100 and the user of the second electronic device 200 accept the connection, the second electronic device 200 may display a UI 907 for inquiring the user of the second electronic device 200 as to whether to accept file transmission from the first electronic device 100. At this time, when the user of the second electronic device 200 accepts a file transmission from the first electronic device 100, the first electronic device 100 may transmit the file to the second electronic device 200.

According to another embodiment of the present invention, when the user of the first electronic device 100 and the user of the second electronic device 200 accept the connection, the first electronic device 100 may transmit, to the second electronic device 200, file information including at least one of the type of the file to be transmitted, the capacity of the file, the expected transmission time of the file, and the amount of battery consumption during transmission of the file. Here, the connection type (connectivity) between the first electronic device 100 and the second electronic device 200 may be determined based on the file information and the capabilities of the first electronic device 100 and the second electronic device 200. That is, in a case of traffic requiring a wide transmission bandwidth such as a video, an access may be made through Wi-Fi or Wi-Fi direct, and in a case of sound source reproduction, an access may be made through Bluetooth or the like. In addition, the access type may be determined according to the distance, and thus different services may be provided for each distance interval. That is, when the distance between the first electronic device 100 and the second electronic device 200 is less than or equal to a specific value, the access may be made through Bluetooth or the like, and when the distance is equal to or more than a specific value, the access may be made through Wi-Fi or Wi-Fi direct.

The second electronic device 200 may further display the file information on a UI 907 inquiring whether the file transmission is acceptable. That is, the user of the second electronic device 200 may check the file information and determine whether to receive the file.

Figure 9D:
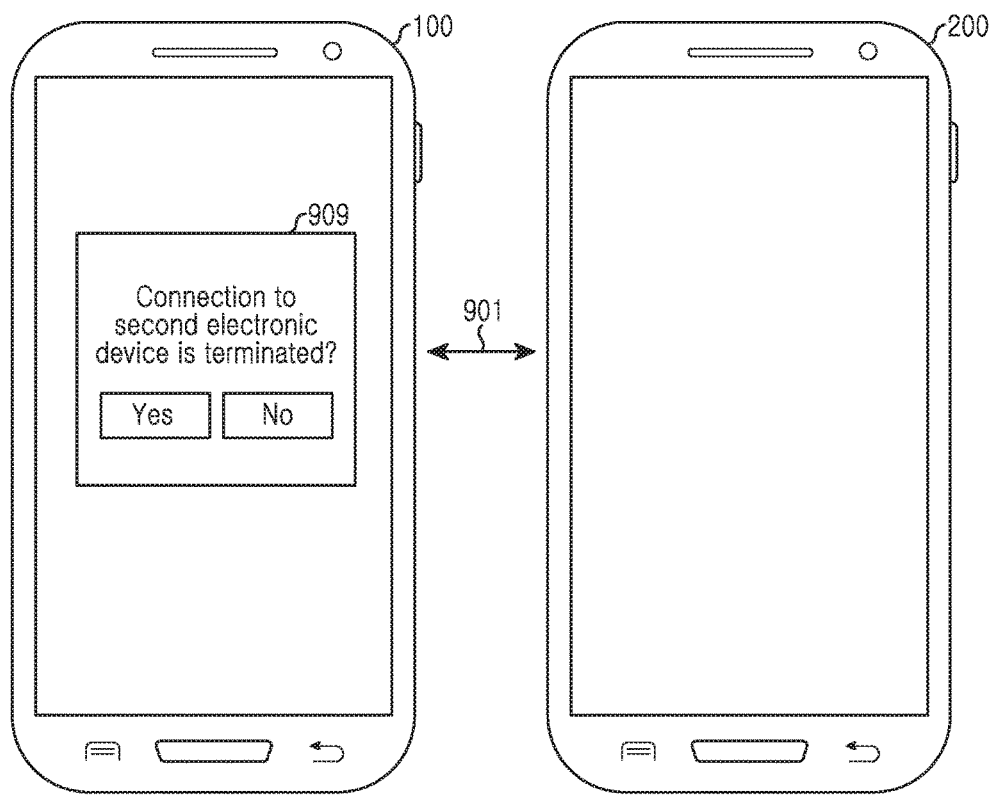

Referring to FIG. 9D, when the strength of a signal received from the second electronic device 200 becomes less than a predetermined threshold value, the first electronic device 100 may output, through the display unit of the first electronic device 100, an indication that the connection with the second electronic device 200 may be terminated. For example, when a user of the first electronic device 100 transmits a file or content mirroring signal to the second electronic device 200 while touching the touch screen of the first electronic device 100 with pressure and time equal to or more than a predetermined criterion, the first electronic device 100 may output, to the display unit of the first electronic device 100, a display indicating how near or far the distance to the second electronic device 200 is. For example, when a touch input from the user of the first electronic device 100 is generated with pressure and for a time equal to or more than a predetermined reference, the first electronic device 100 may measure the strength of a signal received from the second electronic device 200. When the strength of the signal received from the second electronic device 200 becomes less than a predetermined threshold value, the first electronic device 100 may display, on a display unit of the first electronic device 100, an indication notifying that the distance to the second electronic device 200 becomes far by equal to or greater than a threshold and the connection with the second electronic device 200 may be terminated. At this time, when a user of the first electronic device 100 terminates the touch input to the touch screen of the first electronic device 100, the first electronic device 100 may terminate the transmission of a file or content mirroring signal to the second electronic device 200, and may terminate the connection with the second electronic device 200. According to another embodiment of the present invention, the second electronic device 200 may output, through the display unit of the second electronic device 200, an indication that the connection with the first electronic device 100 has been terminated.

Figure 10:
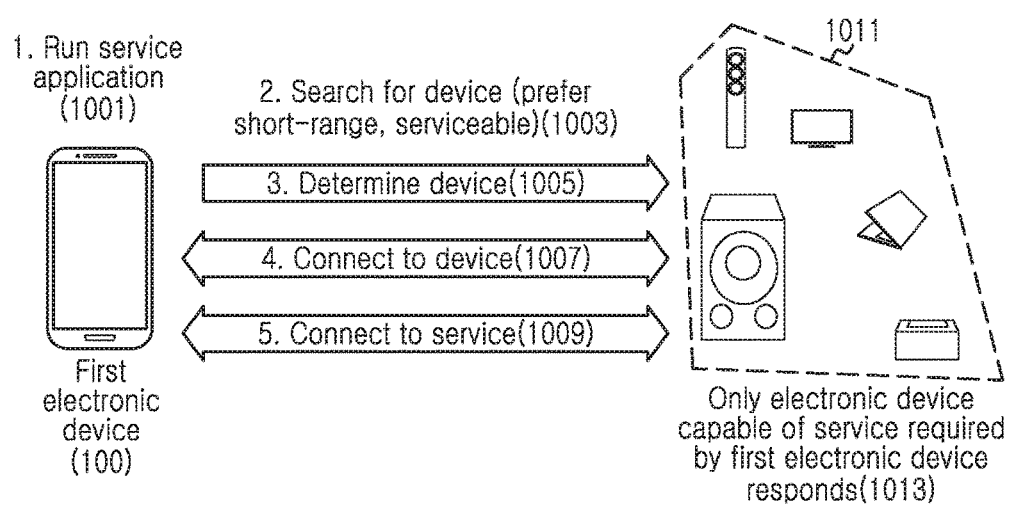
FIG. 10 is an example in which a first electronic device 100 is connected to another electronic device capable of interworking with the first electronic device 100 according to an embodiment of the present invention.

FIG. 10 illustrates an example in which a first electronic device 100 is connected to another electronic device capable of interworking with the first electronic device 100 according to an embodiment of the present invention.

Referring to FIG. 10, the first electronic device 100 executes a service application (indicated by reference numeral 1001), and searches for a plurality of other electronic devices 1011. For example, the first electronic device 100 may transmit an advertising packet to the plurality of other electronic devices 1011 through a BLE module. The advertising packet may include information on a function and communication scheme that can be supported by the first electronic device 100.

The plurality of other electronic devices 1011 that have received the advertising packet from the first electronic device 100 may determine whether interworking with the first electronic device 100 is possible based on the advertising packet. Based on the determination, only the electronic device capable of interworking with the first electronic device 100 among the plurality of other electronic devices 1011 may transmit a response message to the first electronic device 100 (indicated by reference numeral 1013). That is, only the electronic device capable of providing a service required by the first electronic device 100 transmits a response message to the first electronic device 100 (indicated by reference numeral 1013). For example, at least one other electronic device, which is determined that interworking with the first electronic device 100 is possible among the plurality of other electronic devices 1011, may transmit, to the first electronic device 100, information indicating that interworking is possible. For example, another electronic device capable of mirroring a video played back by the first electronic device 100 may transmit, to the first electronic device 100, an advertising packet including information indicating that the interworking with the first electronic device 100 is possible. According to an embodiment of the present invention, the advertising packet may further include information on functions and communication schemes that can be supported by the at least one other electronic device.

The first electronic device 100 may display a UI for notifying a user of information on functions and communication schemes that can be supported by the at least one other electronic device that can interwork. The first electronic device 100 may play back the contents for sharing, by the user of the first electronic device 100, with the at least one other electronic device that can interwork. The contents may be a video or music. At this time, the first electronic device 100 may detect the generation of a touch input of the user on the touch screen of the first electronic device 100. The first electronic device 100 may check another electronic device in which the touch input is continuously generated and the strength of the reception signal is rapidly increased among the at least one other electronic device that can interwork. The first electronic device 100 determines a connection with other electronic device in which the strength of the reception signal is rapidly increased (indicated by reference numeral 1005). The first electronic device 100 exchanges messages for connection with the other electronic device and is connected with the other electronic device (indicated by reference numeral 1007). For example, the first electronic device 100 may be connected to the other electronic device through the wireless LAN. The first electronic device 100 may connect a service with the other electronic device (indicated by reference numeral 1009). For example, the other electronic device may mirror contents played back by the first electronic device 100.

Figure 11:
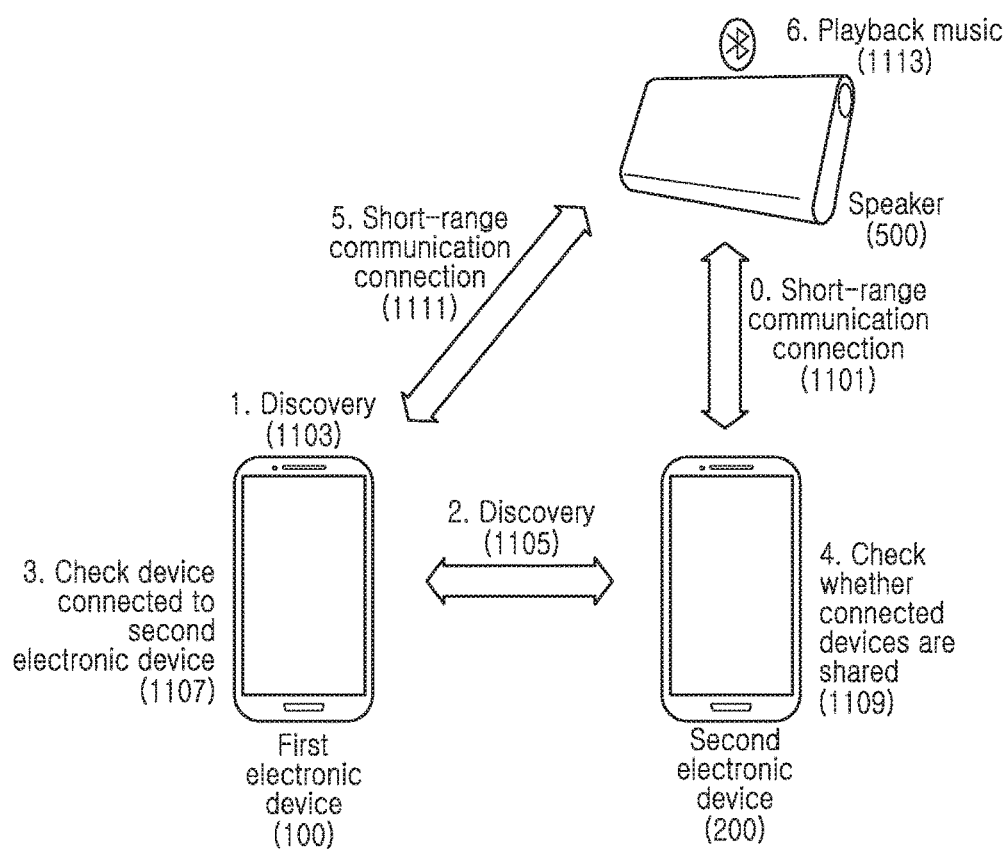
FIG. 11 is an example of discovering a third electronic device through a second electronic device 200 and connecting with the third electronic device, by a first electronic device 100, according to an embodiment of the present invention.

FIG. 11 illustrates an example of discovering a third electronic device through a second electronic device 200 and connecting with the third electronic device, by a first electronic device 100, according to an embodiment of the present invention.

Referring to FIG. 11, the first electronic device 100 according to an embodiment of the present invention may not discover a speaker 500 connected to the second electronic device 200 through a short range communication network (indicated by reference numeral 1101). For example, the speaker 500 connected to the second electronic device 200 through the Bluetooth method may not transmit a response message for a search request message received from the first electronic device 100. At this time, the first electronic device 100 may perform a discovery of at least one other electronic device (indicated by reference numeral 1103), so as to discover the second electronic device 200 (indicated by reference numeral 1105). The first electronic device 100 checks at least one electronic device connected to the second electronic device 200 through the discovery 1103 (indicated by reference numeral 1107). The first electronic device 100 may transmit a message, to the second electronic device 200, requesting the sharing of the at least one electronic device connected to the second electronic device 200. The second electronic device 200 may display a UI for inquiring a user as to whether to share the at least one other electronic device connected to the second electronic device 200 with the first electronic device 100 (indicated by reference numeral 1109). When an input for approving the sharing of the at least one other electronic device is generated from the user, the second electronic device 200 may transmit a message indicating that the sharing has been approved to the first electronic device 100 and the at least one other electronic device. For example, when an input for approving the sharing of the speaker 500 with the first electronic device 100 is generated from the user of the second electronic device 200, the second electronic device 200 may transmit a message indicating the approval to the first electronic device 100 and the speaker 500. The first electronic device 100 and the speaker 500 may exchange signals for a short-range communication connection. The first electronic device 100 and the speaker 500 are connected through a short range communication network (indicated by reference numeral 1111). The first electronic device 100 plays back music through the speaker 500 (indicated by reference numeral 1113).

Figure 12A:
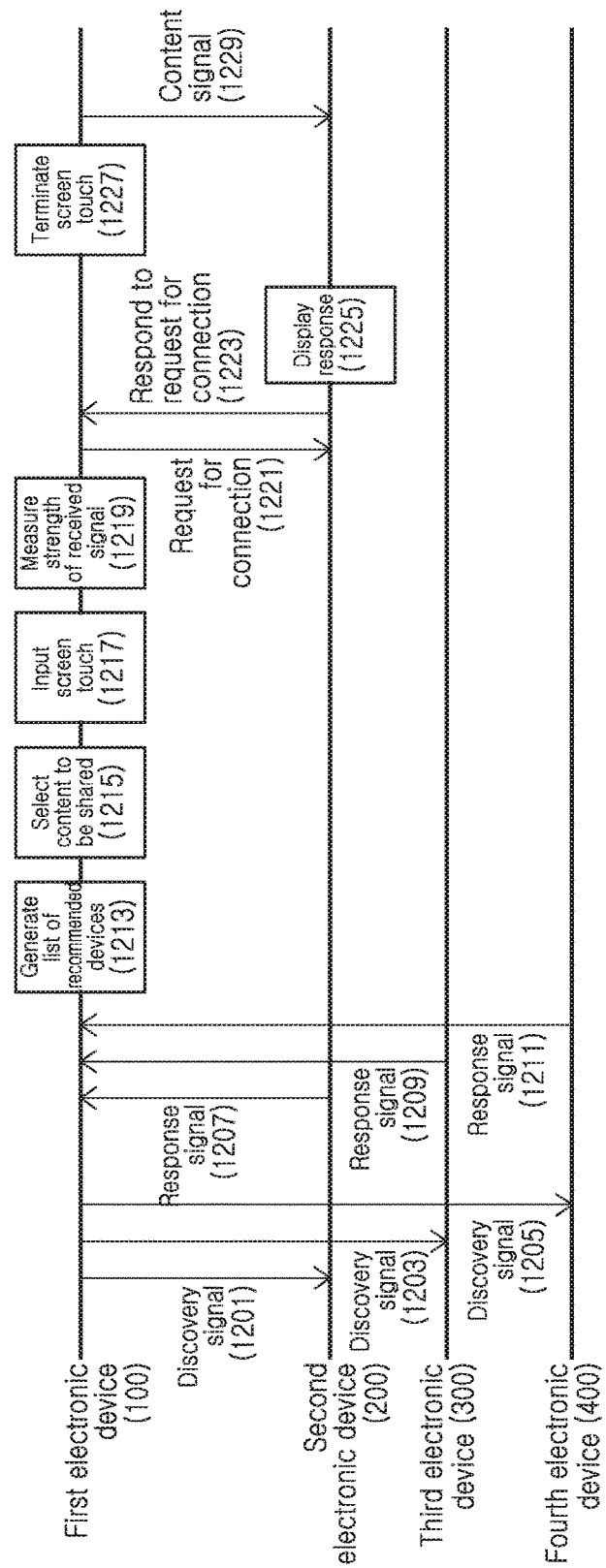
FIG. 12A and FIG. 12B are flowcharts illustrating of exchanging a signal for transmitting and receiving a content mirroring signal by a first electronic device 100 to a fourth electronic device 400 according to an embodiment of the present invention.
Figure 12B:
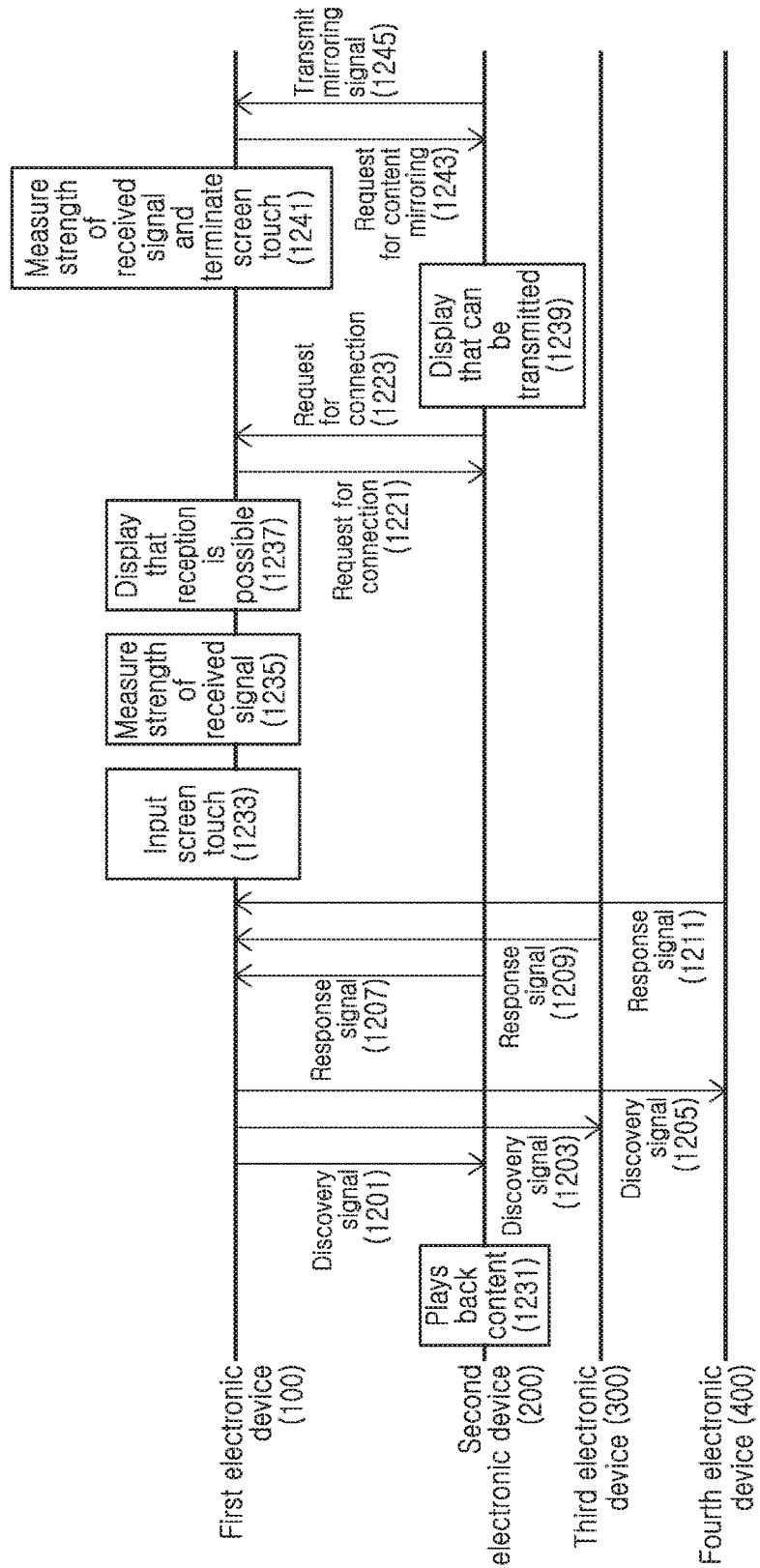

FIG. 12A and FIG. 12B are examples of exchanging signals for transmitting and receiving a content mirroring signal in a first electronic device 100 to a fourth electronic device 400 according to an embodiment of the present invention.

Referring to FIG. 12A, the first electronic device 100 transmits discovery signals 1201 to 1205 for discovering at least one electronic device to the second electronic device 200 to the fourth electronic device 400, respectively. The discovery signals 1201 to 1205 may include information on the first electronic device 100. The information on the first electronic device 100 may include at least one of a type of the first electronic device 100, a communication scheme that can be supported by the first electronic device 100, and a function of the first electronic device 100. The second electronic device 200 to fourth electronic device 400 may transmit response signals 1207 to 1211 to the first electronic device 100 in response to the discovery signals 1201 to 1205, respectively. Each of the response signals 1207 to 1211, transmitted from the second electronic device 200 to fourth electronic device 400 to the first electronic device 100, may include device information of the second electronic device 200 to the fourth electronic device 400. For example, the device information of the second electronic device 200 may include at least one of a type of the second electronic device 200, a communication scheme that can be supported by the second electronic device 200 and a function that can be serviced by the second electronic device 200.

The first electronic device 100 may generate a list of recommended devices according to the response signals 1207 to 1211 received from the second electronic device 200 to fourth electronic device 400, respectively. Operations of transmitting the discovery signal, receiving the response for the discovery signal, and generating the list of recommended devices (indicated by reference numeral 1213) according to the response signal, by the first electronic device 100, may be continuously performed on the background of the first electronic device 100.

The first electronic device 100 may receive, from the user, an input of a signal for selecting contents to be shared with other electronic devices (indicated by reference numeral 1215). The first electronic device 100 may receive, from the user, the input of a signal for selecting contents to be shared with the other electronic device, and then may recognize a touch signal 1217 input from a user through the touch screen of the first electronic device 100.

The first electronic device 100 may measure the strength of a signal received from the second electronic device 200 to fourth electronic device 400 through the response signal to the discovery signal that is continuously performed on the background of the first electronic device 100 (indicated by reference numeral 1219). At this time, when the user of the first electronic device 100 moves the first electronic device 100 close to the second electronic device 200 in order to share the selected content or file with the second electronic device 200, the strength of the reception signal of the second electronic device 200 measured by the first electronic device 100 may be rapidly increased. At this time, when the strength of the signal received from the second electronic device 200 exceeds a predetermined threshold value, the first electronic device 100 may transmit a message requesting the communication connection to the second electronic device 200 (indicated by reference numeral 1221). The second electronic device 200 may transmit a response message for the connection request message received from the first electronic device 100 (indicated by reference numeral 1223). The second electronic device 200 may display an indication that the selected content is ready to be shared to the user of the first electronic device 100 (indicated by reference numeral 1225). For example, the second electronic device 200 may blink the screen display unit of the second electronic device 200 or make a sound through the speaker of the second electronic device 200. The user of the first electronic device 100 may check an indication made by the second electronic device 200 (indicated by reference numeral 1225), and terminate the screen touch on the touch screen of the first electronic device 100 in order to share the selected content with the second electronic device 200 (indicated by reference numeral 1227).

When recognizing that the screen touch input from the user is terminated (indicated by reference numeral 1227), the first electronic device 100 may transmit a signal for sharing the contents to the second electronic device 200. For example, the first electronic device 100 may transmit a signal for mirroring the contents to the second electronic device 200 (indicated by reference numeral 1229).

Referring to FIG. 12B, according to another embodiment of the present invention, the first electronic device 100 may receive the content mirroring signal from the second electronic device 200. For example, the first electronic device 100 transmits the discovery signal 1201 to the second electronic device 200 that is playing back the contents (indicated by reference numeral 1231). At this time, the first electronic device 100 transmits the discovery signal 1203 and discovery signal 1205 to the third electronic device 300 and the fourth electronic device 400, respectively. The second electronic device 200 to fourth electronic device 400 may transmit, to the first electronic device 100, response signals 1207 to 1211 for the discovery signals 1201 to 1205. The discovery signals 1201 to 1205 may include information on the first electronic device 100. The information on the first electronic device 100 may include at least one of a type of the first electronic device 100, a communication scheme that can be supported by the first electronic device 100, and a function of the first electronic device 100. The second electronic device 200 to fourth electronic device 400 may transmit response signals 1207 to 1211 to the first electronic device 100 in response to the discovery signals 1201 to 1205, respectively. Each of the response signals 1207 to 1211, transmitted from the second electronic device 200 to fourth electronic device 400 to the first electronic device 100, may include device information of the second electronic device 200 to the fourth electronic device 400. For example, the device information of the second electronic device 200 may include at least one of a type of the second electronic device 200, a communication scheme that can be supported by the second electronic device 200 and a function that can be serviced by the second electronic device 200.

A user of the first electronic device 100 may input a touch signal to the touch screen of the first electronic device 100 when the user wishes to mirror the contents from the second electronic device 200. That is, the first electronic device 100 may receive, from the user, a touch signal for receiving content mirroring signal from the second electronic device 200 (indicated by reference numeral 1233).

The first electronic device 100 may measure the strength of a signal received from the second electronic device 200 to fourth electronic device 400 through the response signal to the discovery signal that is continuously performed on the background of the first electronic device 100 (indicated by reference numeral 1235). At this time, when a user of the first electronic device 100 moves the first electronic device 100 to a distance close to the second electronic device 200, the strength of a reception signal of the second electronic device 200 measured by the first electronic device 100 may be rapidly increased. At this time, when the strength of the signal received from the second electronic device 200 exceeds a predetermined threshold value, the first electronic device 100 may transmit a message requesting the communication connection to the second electronic device 200 (indicated by reference numeral 1221). The second electronic device 200 may transmit a response message for the connection request message received from the first electronic device 100 (indicated by reference numeral 1223). The second electronic device 200 may display, to the user of the first electronic device 100, an indication that the content mirroring signal can be transmitted (indicated by reference numeral 1239). For example, the second electronic device 200 may blink the screen display unit of the second electronic device 200 or make a sound through the speaker of the second electronic device 200. The user of the first electronic device 100 may check an indication made by the second electronic device 200 (indicated by reference numeral 1239), and may move to a predetermined distance or more spaced away from the second electronic device 200 and terminate a screen touch on the touch screen of the first electronic device 100, in order to receive the content mirroring signal from the second electronic device 200 (indicated by reference numeral 1241). According to another embodiment of the present invention, the first electronic device 100 may display an indication that it should be spaced a predetermined distance or more away from the second electronic device 200 in order to receive the content mirroring signal therefrom. The first electronic device 100 may determine the indication based on a distance threshold of the first electronic device and a distance threshold of the second electronic device.

When recognizing that the screen touch input from the user is terminated (indicated by reference numeral 1231), the first electronic device 100 may transmit a message signal requesting the transmission of the content mirroring signal to the second electronic device 200 (indicated by reference numeral 1243). After receiving the request message, the second electronic device 200 transmits the content mirroring signal to the first electronic device 100 (indicated by reference numeral 1245).

Figure 13A:
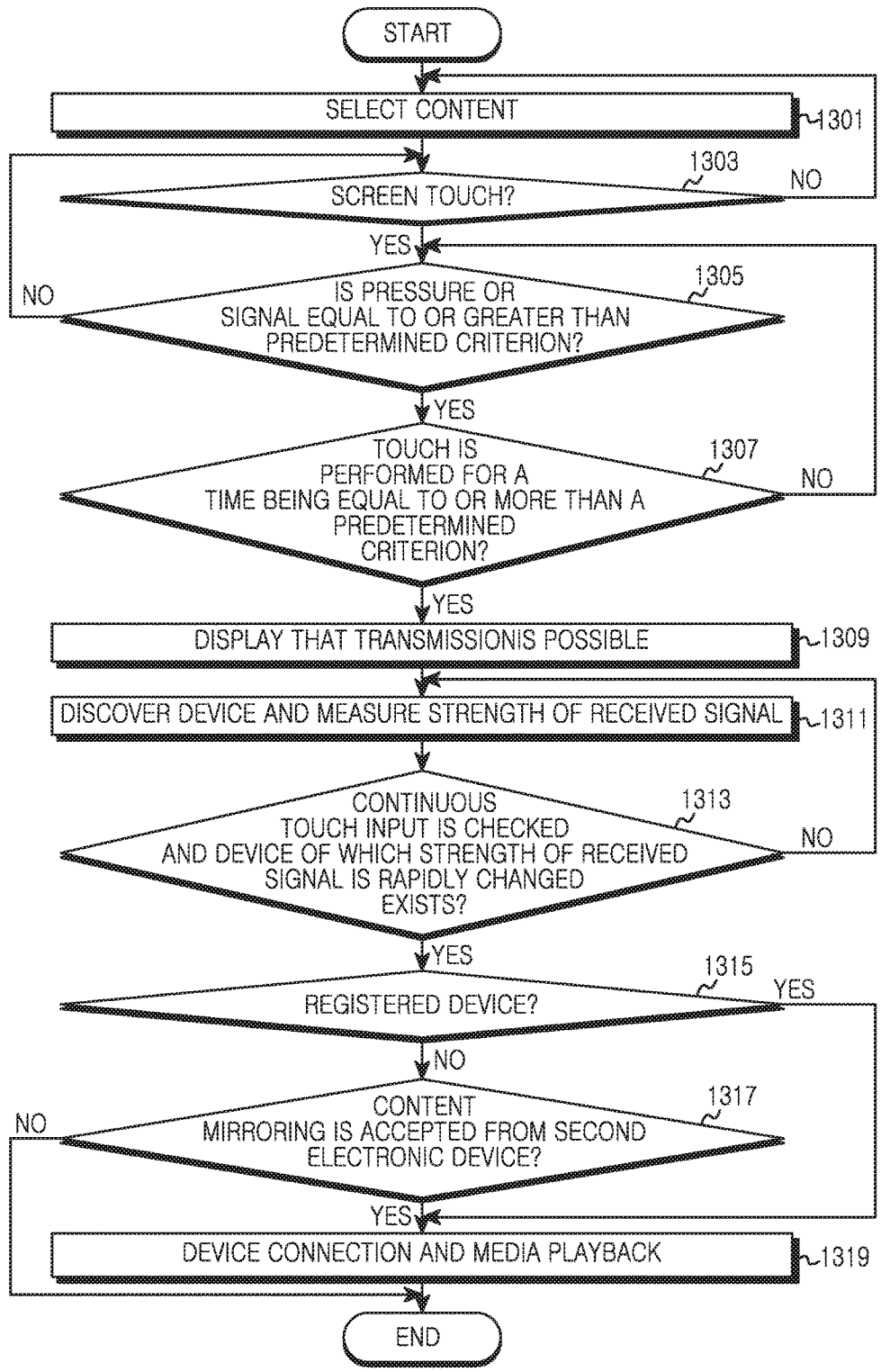
FIG. 13A and FIG. 13B are flowcharts illustrating operations of transmitting and receiving a file or content mirroring signal by a first electronic device 100 and a second electronic device 200 according to another embodiment of the present invention.
Figure 13B:
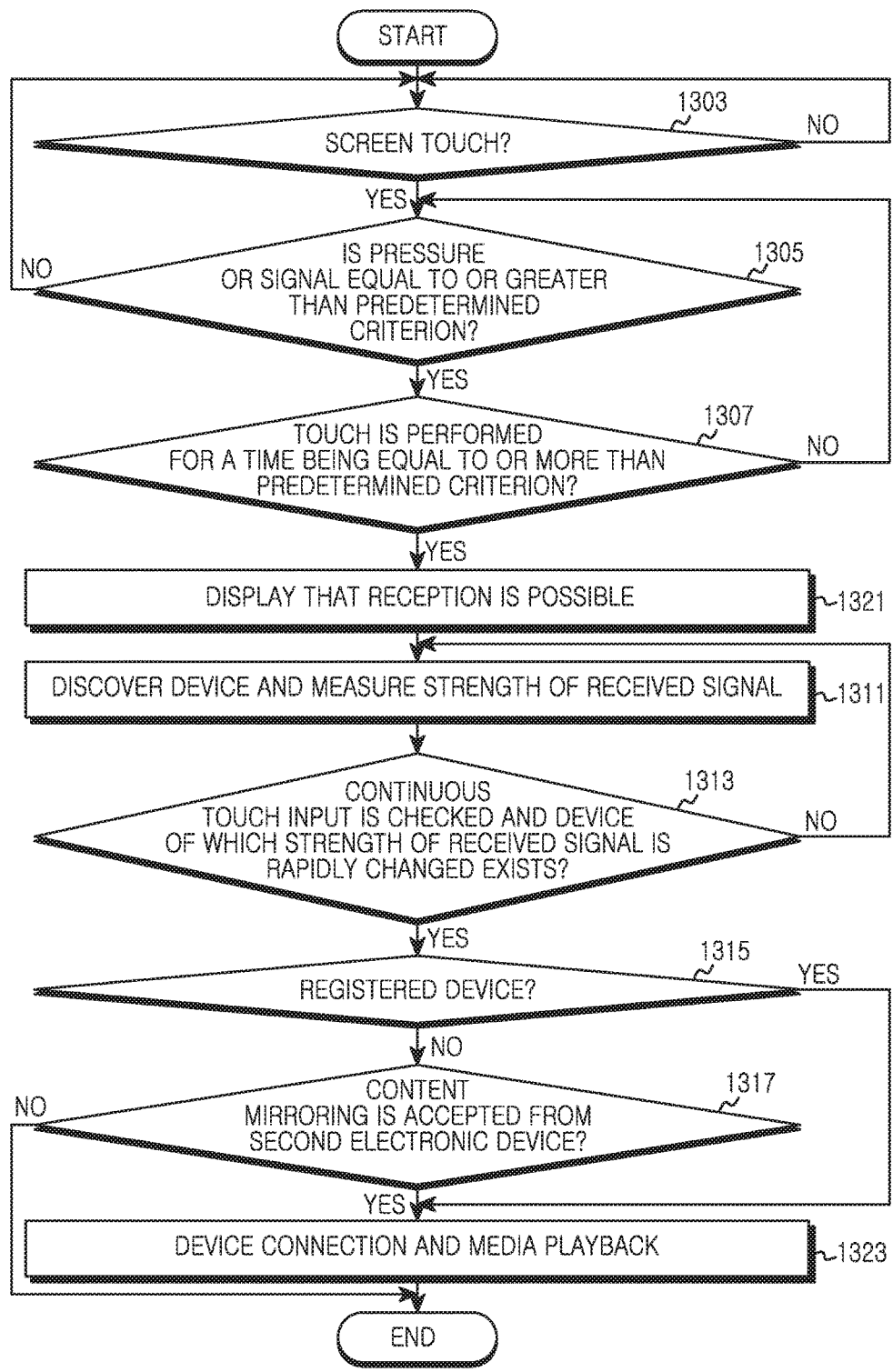

FIG. 13A and FIG. 13B are flowcharts illustrating operations of transmitting and receiving a file or content mirroring signal in a first electronic device 100 and a second electronic device 200 according to another embodiment of the present invention.

Referring to FIG. 13A, the first electronic device 101 proceeds to step 1301, in which the first electronic device recognizes that the contents to be mirrored to the second electronic device 200 is selected. The user may select the contents to be mirrored from the first electronic device 100 to the second electronic device 200. The first electronic device 100 may recognize that the user has selected the contents to be mirrored to the second electronic device 200.

The first electronic device 100 proceeds to step 1303, in which the first electronic device checks whether a touch input is performed on the touch screen of the first electronic device 100. The first electronic device 100 may check whether the user has touched the touch screen. When the first electronic device 100 checks the touch input on the touch screen, the process may proceed to step 1305. For example, when the user touches the touch screen of the first electronic device 100 that is playing back the contents to be mirrored to the second electronic device 200, the first electronic device 100 may check the touch input from the user. When the first electronic device 100 may not check the touch input on the touch screen, the process may return to step 1301.

The first electronic device 100 proceeds to step 1305, in which the first electronic device determines whether the touch input to the first electronic device 100 is performed by pressure equal to or greater than a predetermined criterion or a signal equal to or more than a predetermined criterion. The first electronic device 100 may check whether the user has touched the touch screen of the first electronic device 100 with pressure equal to or greater than a predetermined criterion. When the first electronic device 100 checks that the user has touched the touch input on the touch screen with pressure equal to or more than the predetermined criterion, the process may proceed to step 1307. When the touch input is not performed by a pressure that is equal to or more than the predetermined criterion, the first electronic device 100 proceeds to step 1303, in which the first electronic device may check again whether the touch input is performed.

The first electronic device 100 proceeds to step 1307, in which the first electronic device may determine whether the touch input to the first electronic device 100 is performed for a time equal to or more than a predetermined criterion. The first electronic device 100 may check whether the user has touched the touch screen of the first electronic device 100 for a time equal to or more than a predetermined criterion. When the touch input is continuously performed for a time equal to or more than a predetermined criterion, the first electronic device 100 proceeds to step 1321, in which the first electronic device may display, to the first electronic device 100, an indication that the content mirroring to the second electronic device 200 is possible. When the touch input is not continuously performed for a time equal to or more than a predetermined criterion, the process returns to step 1305 and the first electronic device 100 may determine again whether the touch input is performed with pressure equal to or greater than a predetermined criterion.

The first electronic device 100 proceeds to step 1321, in which the first electronic device displays, on the display unit of the first electronic device 100, an indication that the first electronic device 100 may mirror the contents to the second electronic device 200. The first electronic device 100 may display, on the touch screen of the first electronic device 100, an indication that the first electronic device 100 may mirror the contents to the second electronic device 200 so that the user may recognize that the first electronic device 100 mirrors the contents to the second electronic device 200.

The first electronic device 100 proceeds to step 1311, in which the first electronic device performs a device discovery and a reception signal strength measurement. The first electronic device 100 may discover a signal from the second electronic device 200 capable of receiving the content mirroring signal, and measure the reception signal strength for the signal received from the second electronic device 200. For example, the first electronic device 100 may receive a promised signal from the second electronic device 200, so as to detect the reception signal strength of the second electronic device 200.

The first electronic device 100 proceeds to step 1313, in which the first electronic device determines whether a continuous touch signal is input from the user and whether the strength of the signal received from the second electronic device 200 is rapidly changed. According to another embodiment of the present invention, the first electronic device 100 may measure the reception signal strength for each of a plurality of other electronic devices. For example, the first electronic device 100 may determine whether there is an electronic device of which the reception signal strength is rapidly changed among the plurality of other electronic devices. The first electronic device 100 may check whether a continuous touch signal is input from the user, and simultaneously measure the reception signal strength of each signal received from the plurality of electronic devices. At this time, the first electronic device 100 may identify one electronic device of which the received signal strength is rapidly changed among the plurality of electronic devices. For example, when the user of the first electronic device moves close to one electronic device among the at least one electronic device, the reception signal strength value for the signal received from the electronic device may rapidly change. The first electronic device may identify the one electronic device of which the reception signal strength is rapidly changed.

The first electronic device 100 proceeds to step 1315, in which the first electronic device determines whether the second electronic device 200 is a device registered in the first electronic device. The first electronic device 100 may receive, from the second electronic device 200, device information including at least one of a model name, a telephone number, and an identifier of the second electronic device 200. The first electronic device 100 may determine whether the second electronic device 200 is a device registered in the first electronic device 100 based on the device information received from the second electronic device 200. The criterion of the registered device is determined based on at least one of whether the second electronic device 200 and the first electronic device 100 have a call history, whether the second electronic device 200 and the first electronic device 100 have a communication connection history, and whether the second electronic device 200 is registered in the telephone directory of the first electronic device 100. When it is determined that the second electronic device 200 is a device registered in the first electronic device 100, the first electronic device proceeds to step 1319, in which the first electronic device may establish the communication connection with the second electronic device 200 and transmit the content mirroring signal to the second electronic device 200.

When it is determined that the second electronic device 200 is not a device registered in the first electronic device 100, the first electronic device 100 proceeds to step 1317, in which the first electronic device may check whether the content mirroring signal is accepted from the second electronic device 200. The first electronic device 100 may transmit a message requesting the reception of a content mirroring signal to the second electronic device 200.

When a message accepting the reception of the content mirroring signal is received from the second electronic device 200, the first electronic device 100 proceeds to step 1319, in which the first electronic device establishes the communication connection with the second electronic device 200 and transmits the content mirroring signal to the second electronic device 200. The first electronic device 100 may establish the communication connection with the second electronic device 200 in order to transmit the content mirroring signal. The first electronic device 100 may transmit the content mirroring signal to the second electronic device 200 through a link connected to the second electronic device 200.

According to another embodiment of the present invention, the first electronic device 100 may receive the content mirroring signal from the second electronic device 200.

Referring to FIG. 13B, the first electronic device 100 proceeds to step 1303, in which the first electronic device checks whether a touch input is performed on the touch screen of the first electronic device 100. The first electronic device 100 may check whether the user has touched the touch screen. When the first electronic device 100 checks the touch input on the touch screen, the process may proceed to step 1305.

The first electronic device 100 proceeds to step 1305, in which the first electronic device determines whether the touch input to the first electronic device 100 is performed by pressure equal to or greater than a predetermined criterion or a signal equal to or more than a predetermined criterion. The first electronic device 100 may check whether the user has touched the touch screen of the first electronic device 100 with pressure equal to or greater than a predetermined criterion. When the first electronic device 100 checks that the user has touched the touch input on the touch screen with pressure equal to or more than the predetermined criterion, the process may proceed to step 1307. When the touch input is not performed by the pressure equal to or more than the predetermined criterion, the first electronic device 100 proceeds to step 1303, in which the first electronic device may check again whether the touch input is performed.

The first electronic device 100 proceeds to step 1321, in which the first electronic device may determine whether the touch input to the first electronic device 100 is performed for a time equal to or more than a predetermined criterion. The first electronic device 100 may check whether the user has touched the touch screen of the first electronic device 100 for a time equal to or more than a predetermined criterion.

When the touch input is continuously performed for a time equal to or more than a predetermined criterion, the first electronic device 100 proceeds to step 1321, in which the first electronic device displays an indication that the content mirroring signal can be received from the second electronic device 200. When the touch input does not continuously performed for a time equal to or more than a predetermined criterion, the process returns to step 1305 and the first electronic device 100 may determine again whether the touch input is performed with pressure equal to or greater than a predetermined criterion.

The first electronic device 100 proceeds to step 1311, in which the first electronic device performs the device discovery and reception signal strength measurement. The first electronic device 100 may discover a signal from the second electronic device 200, which can transmit the content mirroring signal, and measure the reception signal strength for the signal received from the second electronic device 200. For example, the first electronic device 100 may receive a discovery signal transmitted by the second electronic device 200, so as to detect the reception signal strength of the second electronic device 200.

The first electronic device 100 proceeds to step 1313, in which the first electronic device determines whether a continuous touch signal is input from the user and whether the strength of the signal received from the second electronic device 200 is rapidly changed. According to another embodiment of the present invention, the first electronic device 100 may measure the reception signal strength for each of a plurality of other electronic devices. For example, the first electronic device 100 may determine whether there is an electronic device of which the reception signal strength is rapidly changed among the plurality of other electronic devices. The first electronic device 100 may check whether a continuous touch signal is input from the user, and simultaneously measure the reception signal strength of each signal received from the plurality of electronic devices. At this time, the first electronic device 100 may identify one electronic device of which the received signal strength is rapidly changed among the plurality of electronic devices. For example, when the user of the first electronic device moves close to one electronic device among the at least one electronic device, the reception signal strength value for the signal received from the electronic device may rapidly change. The first electronic device may identify the one electronic device of which the reception signal strength is rapidly changed.

The first electronic device 100 proceeds to step 1315, in which the first electronic device determines whether the second electronic device 200 is a device registered in the first electronic device. The first electronic device 100 may receive, from the second electronic device 200, device information including at least one of a model name, a telephone number, and an identifier of the second electronic device 200. The first electronic device 100 may determine whether the second electronic device 200 is a device registered in the first electronic device 100 based on the device information received from the second electronic device 200. The criterion of the registered device is determined based on at least one of whether the second electronic device 200 and the first electronic device 100 have a call history, whether the second electronic device 200 and the first electronic device 100 have a communication connection history, and whether the second electronic device 200 is registered in the telephone directory of the first electronic device 100. When it is determined that the second electronic device 200 is a device registered in the first electronic device 100, the first electronic device 100 proceeds to step 1323, in which the first electronic device may establish the communication connection with the second electronic device 200 and receive the content mirroring signal from the second electronic device 200.

When it is determined that the second electronic device 200 is not a device registered in the first electronic device 100, the first electronic device 100 proceeds to step 1317, in which the first electronic device may check whether the content mirroring signal is received from the second electronic device 200. For example, the first electronic device 100 may output a UI inquiring a user as to whether to receive the content mirroring signal from the second electronic device 200. The first electronic device 100 may determine whether to receive the content mirroring signal from the second electronic device 200 based on the user's input signal.

When it is determined that the content mirroring signal is received from the second electronic device 200, the first electronic device 100 proceeds to step 1319, in which the first electronic device establishes the communication connection with the second electronic device 200 and receives the content mirroring signal from the second electronic device 200. The first electronic device 100 may establish the communication connection with the second electronic device 200 in order to receive the content mirroring signal. The first electronic device 100 may receive the content mirroring signal from the second electronic device 200 through a link connected to the second electronic device 200.

Figure 14:
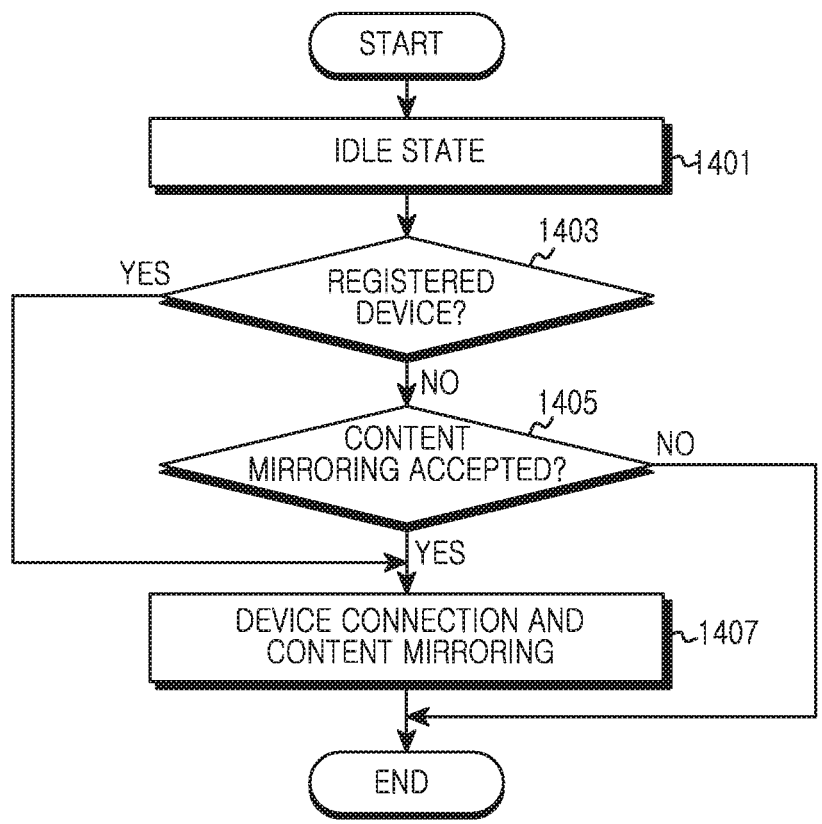
FIG. 14 is a flowchart illustrating an operation of receiving a content mirroring signal from a first electronic device 100 by a second electronic device 200 according to an embodiment of the present invention.

FIG. 14 is a flowchart illustrating an operation of receiving a content mirroring signal from a first electronic device 100 by a second electronic device 200 according to an embodiment of the present invention.

Referring to FIG. 14, the second electronic device 200 proceeds to step 1401, in which the second electronic device is maintained in an idle state. The idle state means a state where the power of the second electronic device 200 is activated (on) so as to transmit and receive a signal to and from the first electronic device 100. The second electronic device 200 may transmit a signal for measuring the reception signal strength to the first electronic device 100 in the idle state.

The second electronic device 200 proceeds to step 1403, in which the second electronic device checks whether the first electronic device 100 is a device registered in the second electronic device 200. The first electronic device 100 may transmit device information on the first electronic device 100 to the second electronic device 200. The device information may include at least one of a model name, a telephone number, and an identifier of the first electronic device 100. The second electronic device 200 may receive the device information transmitted by the first electronic device 100. The second electronic device 200 may determine whether the first electronic device 100 is a device registered in the second electronic device 200 based on the device information. The second electronic device 200 may determine that the first electronic device 100 is a device registered in the second electronic device 200 when corresponding to at least one of the cases where at least one of the telephone number, the model name, and the ID of the first electronic device 100 is registered in the second electronic device 200, the first electronic device 100 and the second electronic device 200 have a call history, and the first electronic device 100 and the second electronic device 200 have a communication connection history.

When it is determined that the first electronic device 100 is a device registered in the second electronic device 200, the second electronic device 200 proceeds to step 1407, in which the second electronic device may establish the communication connection with the first electronic device 100 and receive the content mirroring signal from the first electronic device 100.

When it is determined that the first electronic device 100 is not a device registered in the second electronic device 200, the second electronic device 200 proceeds to step 1405, in which the second electronic device may determine whether to accept the content mirroring signal. The second electronic device 200 may display, on the display unit of the second electronic device 200, a UI inquiring the user of the second electronic device 200 as to whether to receive the content mirroring signal from the first electronic device 100. At this time, when an input as to whether to accept the content mirroring signal is not performed within a predetermined time, the second electronic device 200 may return to step 1401 and maintain the idle state. The second electronic device 200 may terminate the process when receiving an input of rejecting the content mirroring signal reception from the user within a predetermined time.

When receiving an input of a signal for accepting the reception of the content mirroring signal from the user, the second electronic device 200 proceeds to step 1407, in which the second electronic device establishes the communication connection with the first electronic device 100 so as to receive the content mirroring signal from the first electronic device 100, and receives the content mirroring signal from the first electronic device 100. The second electronic device 200 may receive the content mirroring signal from the first electronic device 100 through a link connected to the first electronic device 100.

Figure 15:
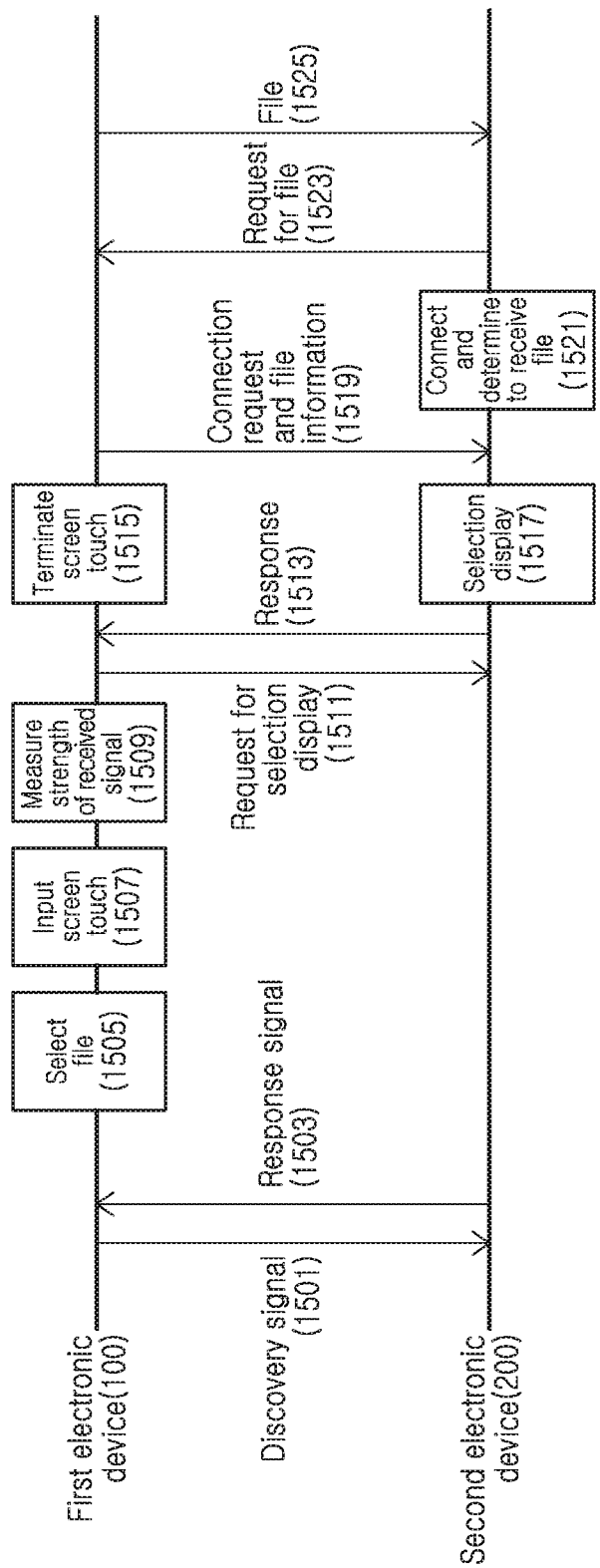
FIG. 15 is a flowchart illustrating of signal exchanging for transmitting a file from a first electronic device 100 to a second electronic device 200 according to an embodiment of the present invention.

FIG. 15 illustrates an example of a signal exchange for transmitting a file from a first electronic device 100 to a second electronic device 200 according to an embodiment of the present invention.

Referring to FIG. 15, the first electronic device 100 may transmit a signal 1501 for discovering a device to the second electronic device 200. The signal for discovering the device may include information on the first electronic device 100. The information on the first electronic device 100 may include at least one of a type of the first electronic device 100, a communication scheme that can be supported by the first electronic device 100, and a function of the first electronic device 100. The second electronic device 200 may transmit a response signal 1503 to the first electronic device 100 in response to the signal 1501 for discovering the device, received from the first electronic device 100. The response signal 1503 transmitted to the first electronic device 100 by the second electronic device 200 may include a device information of the second electronic device 200. For example, the device information of the second electronic device 200 may include at least one of a type of the second electronic device 200, a communication scheme that can be supported by the second electronic device 200 and a function that can be serviced by the second electronic device 200.

The first electronic device 100 may generate a list of recommended devices according to the response signal 1507 received from the second electronic device 200. Operations of transmitting the signal for discovering the device, receiving the response for the signal for discovering the device, and generating the list of recommended devices according to the response signal, by the first electronic device 100, may be continuously performed on the background of the first electronic device 100.

The first electronic device 100 may receive, from the user, an input of a signal for selecting a file for transmitting to the second electronic device 200 (indicated by reference numeral 1509). The first electronic device 100 may receive, from the user, the input of the signal for selecting a file to be transmitted to the second electronic device 200, and then may recognize a touch signal 1511 input from the user through the touch screen of the first electronic device 100.

The first electronic device 100 may measure the reception signal strength of the signal received from the second electronic device 200 through the response signal for the signal for the device discovery, which is continuously performed on the background of the first electronic device 100 (indicated by reference numeral 1513). At this time, when the user of the first electronic device 100 moves the first electronic device 100 close to the second electronic device 200 in order to transmit the selected file to the second electronic device 200, the reception signal strength for the reception signal of the second electronic device 200 measured by the first electronic device 100 may be rapidly increased. When the reception signal strength of the signal received from the second electronic device 200 exceeds a predetermined threshold value, the first electronic device 100 may determine whether to establish the communication connection with the second electronic device 200. At this time, the first electronic device 100 may transmit, to the second electronic device 200, a message 1511 requesting an indication that the second electronic device 200 is selected. The second electronic device 200 may transmit a response 1513 for the message 1511 to the first electronic device 100 and display 1517 such that the user of the first electronic device 100 and the user of the second electronic device 200 may recognize that the second electronic device 200 has been selected. For example, the second electronic device 200 may notify the users, by blinking lighting or outputting a sound, that the second electronic device 200 has been selected.

When the second electronic device 200 is a device not registered in the first electronic device 100, the first electronic device 100 may display a message inquiring the user of the first electronic device 100 as to whether to transmit the file to the second electronic device 200. When the user of the first electronic device 100 terminates a touch input to the touch screen of the first electronic device 100 (indicated by reference numeral 1515), the first electronic device 100 may transmit a message requesting a communication connection to the second electronic device 200 and transmit information on the selected file (indicated by reference numeral 1519). The information on the file may include at least one of a name of the file, a size of the file, a time consumed during the file transmission, an amount of battery consumption during the file transmission, and a resource amount used during the file transmission.

The second electronic device 200 may determine whether to receive the file from the first electronic device 100 (indicated by reference numeral 1521). For example, the second electronic device 200 may display, on the screen display unit of the second electronic device 200, a UI inquiring the user of the second electronic device 200 as to whether to receive the file from the first electronic device 100.

When the user of the second electronic device 200 inputs a signal for accepting the file transmission from a first electronic device 100, the second electronic device 200 may transmit, to the first electronic device 100, the communication connection acceptance and a message requesting the file (indicated by reference numeral 1523). The first electronic device 100 may transmit the file to the second electronic device 200 in response to the file request message of the second electronic device 200 (indicated by reference numeral 1525).

Figure 16:
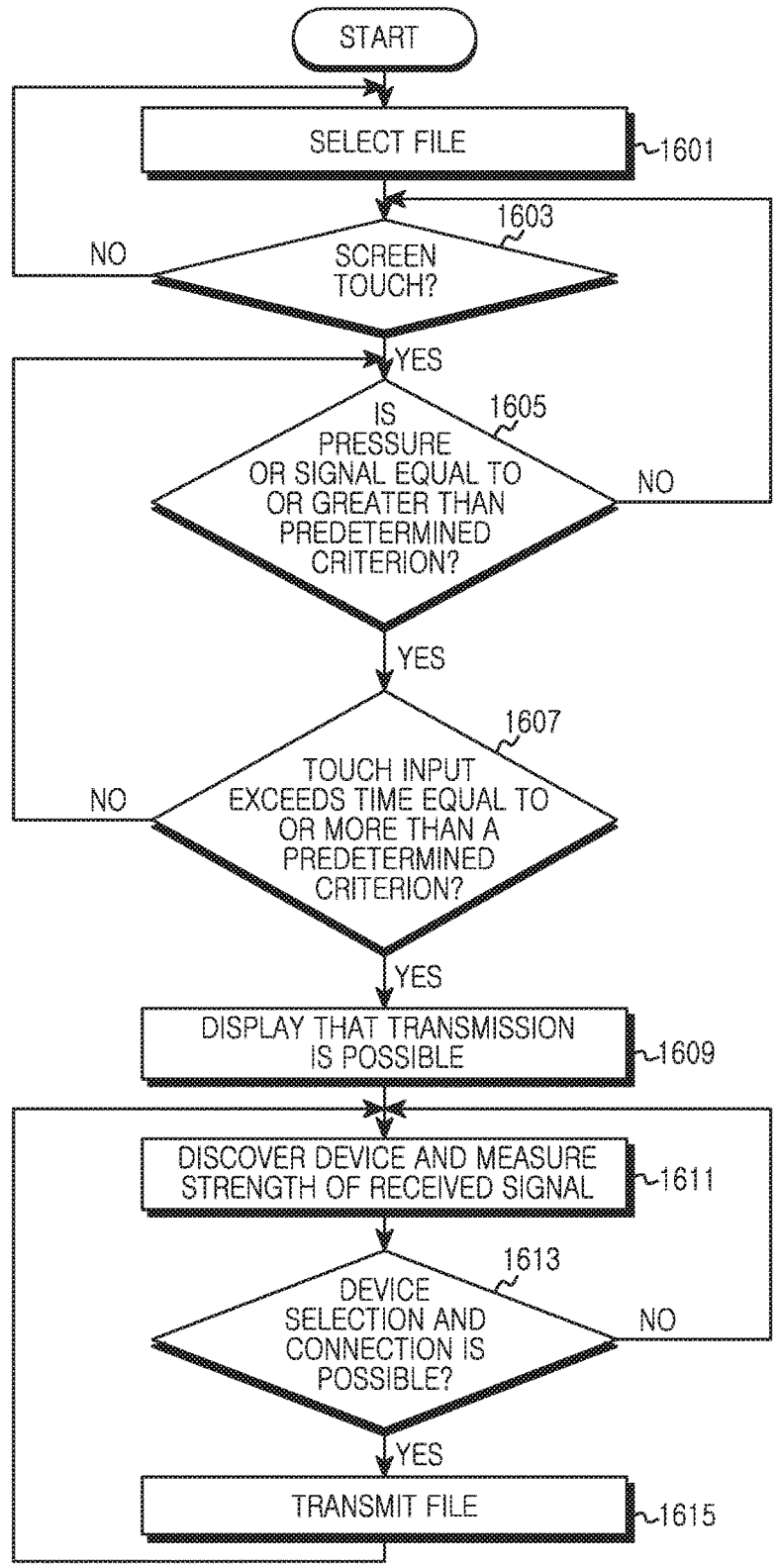
FIG. 16 is a flowchart illustrating an operation of transmitting a file from a first electronic device 100 to at least one electronic device according to an embodiment of the present invention.

FIG. 16 is a flowchart illustrating an operation of transmitting a file from a first electronic device 100 to at least one electronic device according to an embodiment of the present invention.

Referring to FIG. 16, when the proceeds to step 1601, the first electronic device 100 selects a file to be transmitted to the at least one electronic device. The first electronic device 100 may select a file to be transmitted to the at least one electronic device according to a user input of the first electronic device 100.

The first electronic device 100 proceeds to step 1603, in which the first electronic device checks whether a touch signal is input to the screen of the first electronic device 100. The user of the first electronic device 100 may touch the touch screen of the first electronic device 100 in order to transmit the file to the at least one electronic device. The first electronic device 100 may detect the touch input of the user.

The first electronic device 100 proceeds to step 1605, in which the first electronic device checks whether the touch input is performed with pressure equal to or greater than a predetermined criterion. The first electronic device 100 may determine whether the touch input to the touch screen of the first electronic device 100 is performed, by the user of the first electronic device 100, with pressure equal to or more than a predetermined criterion. When the input of the touch signal is not performed with pressure equal to or more than a predetermined criterion, the first electronic device 100 proceeds to step 1603, in which the first electronic device may check again whether the touch signal is input.

When the touch input is performed with pressure equal to or greater than a predetermined criterion, the first electronic device 100 proceeds to step 1607, in which the first electronic device determines whether the touch input exceeds a time equal to or more than a predetermined criterion. The first electronic device 100 may determine whether the touch input from the user exceeds a time equal to or more than a predetermined criterion. When the touch input from the user does not exceed a time equal to or more than a predetermined criterion, the process returns to step 1605 and the first electronic device 100 may check again whether the touch input from the user is performed with pressure equal to or greater than a predetermined criterion.

When the touch input from the user exceeds the time equal to or more than a predetermined criterion, the first electronic device 100 proceeds to step 1609, in which the first electronic device displays an indication that the file transmission is possible. The first electronic device 100 may display, on the display unit of the first electronic device 100, an indication that the file may be transmitted to the at least one electronic device.

The first electronic device 100 proceeds to step 1611, in which the first electronic device discovers a signal of the at least one electronic device, and measures the strength of the signal received from the at least one electronic device. The first electronic device 100 may discover the signal from the at least one electronic device. The first electronic device 100 may receive a signal for measuring the reception signal strength from the at least one electronic device.

The first electronic device 100 proceeds to step 1613, in which the first electronic device determines whether to select one electronic device from among the at least one electronic device and whether connection thereto is possible. The user of the first electronic device 100 may select an electronic device for receiving the file to be transmitted by the first electronic device 100. For example, the user may move the first electronic device 100 to a location close to one electronic device among the at least one electronic device in order to transmit the file to the electronic device. The first electronic device 100 may measure the strength of each signal received from the at least one electronic device. At this time, when the user moves the first electronic device 100 to one electronic device among the at least one electronic device, the first electronic device 100 may recognize that the strength of the reception signal from the one electronic device is rapidly changed. The first electronic device 100 may transmit a message requesting the acceptance of the file reception to the one electronic device of which the reception signal strength has been rapidly changed. When receiving a message rejecting the file reception from the one electronic device, the process returns to the step 1611, and the first electronic device 100 may discover the at least one electronic device and measure the strength of the signal received from the at least one electronic device.

When receiving a message for accepting the file reception from the one electronic device, the first electronic device 100 proceeds to step 1615, in which the first electronic device establishes the communication connection for transmitting the file to the one electronic device, and performs the file transmission. When transmitting a message for accepting the file reception to the first electronic device 100, the one electronic device may output a blinking lighting signal to the display unit of the second electronic device 200 or output an acoustic signal through a speaker of the second electronic device 200 so that the user of the first electronic device 100 may recognize that the file reception has been accepted. The user of the first electronic device 100 may terminate the touch input to the first electronic device 100 after recognizing that the second electronic device 200 has accepted the file reception. The first electronic device 100 may transmit the file to the second electronic device 200 after recognizing that the touch signal has been terminated.

When the process returns to step 1611, the first electronic device 100 performs the device discovery and reception signal strength measurement. The first electronic device 100 may perform the device discovery and the received signal strength measurement in order to transmit the file to one other electronic device among the at least one electronic device.

Figure 17:
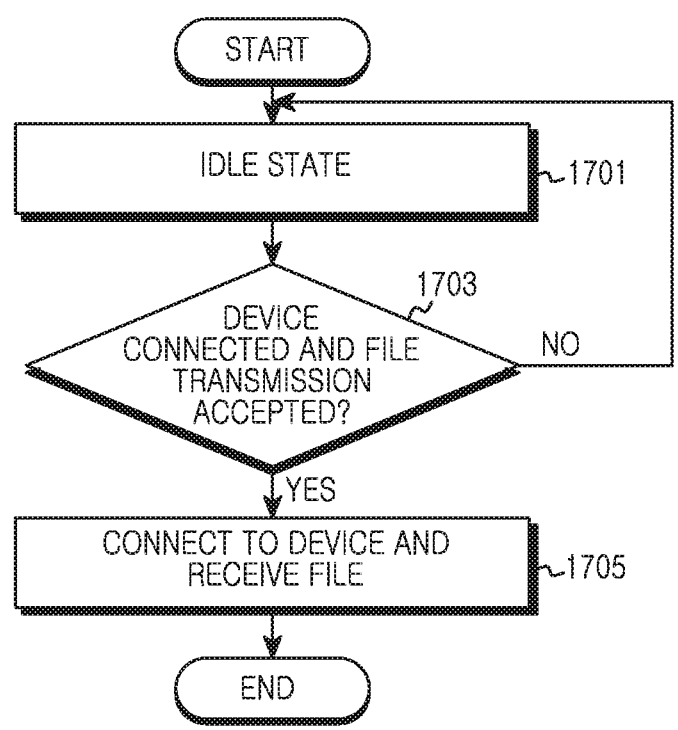
FIG. 17 is a flowchart illustrating an operation of receiving a file from a first electronic device 100 by a second electronic device 200 according to an embodiment of the present invention.

FIG. 17 is a flowchart illustrating an operation of receiving a file from a first electronic device 100 by a second electronic device 200 according to an embodiment of the present invention.

Referring to FIG. 17, the second electronic device 200 proceeds to step 1701, in which the second electronic device is maintained in an idle state. The idle state means a state where the power of the second electronic device 200 is activated (on) so as to transmit and receive a signal to and from the first electronic device 100. The second electronic device 200 may transmit and receive a promised signal to and from the second electronic device 200 in the idle state.

The second electronic device 200 proceeds to step 1703, in which the second electronic device determines whether to connect the first electronic device 100 and whether to receive a file. The second electronic device 200 may receive a message requesting the acceptance of the file reception from the first electronic device 100. The second electronic device 200 may display a UI on the display unit of the second electronic device 200 so as to receive from the user of the second electronic device 200 as to whether to receive the file from the first electronic device 100. The user of the second electronic device 200 may input whether to receive the file from the first electronic device 100 to the second electronic device 200 through the UI. The second electronic device 200 may determine whether to receive the file from the first electronic device 100 according to the user input. When receiving an input of a signal rejecting the file reception from the user, the process returns to step 1701 and the second electronic device 200 may maintain the idle state.

When receiving an input of a signal for accepting the file reception from the user, the second electronic device 200 proceeds to step 1705, in which the second electronic device establishes a connection with the first electronic device 100 and performs the file reception. The second electronic device 200 may output a blinking lighting through the display unit of the second electronic device 200 or output an acoustic signal through the speaker of the second electronic device 200, so that a user of the first electronic device 100 may recognize that the second electronic device 200 has accepted the file reception by the first electronic device 100. The second electronic device 200 may establish the communication connection with the first electronic device 100 in order to receive the file from the first electronic device 100. The second electronic device 200 may receive the file from the first electronic device 100 through a link established through the communication connection.

Figure 18:
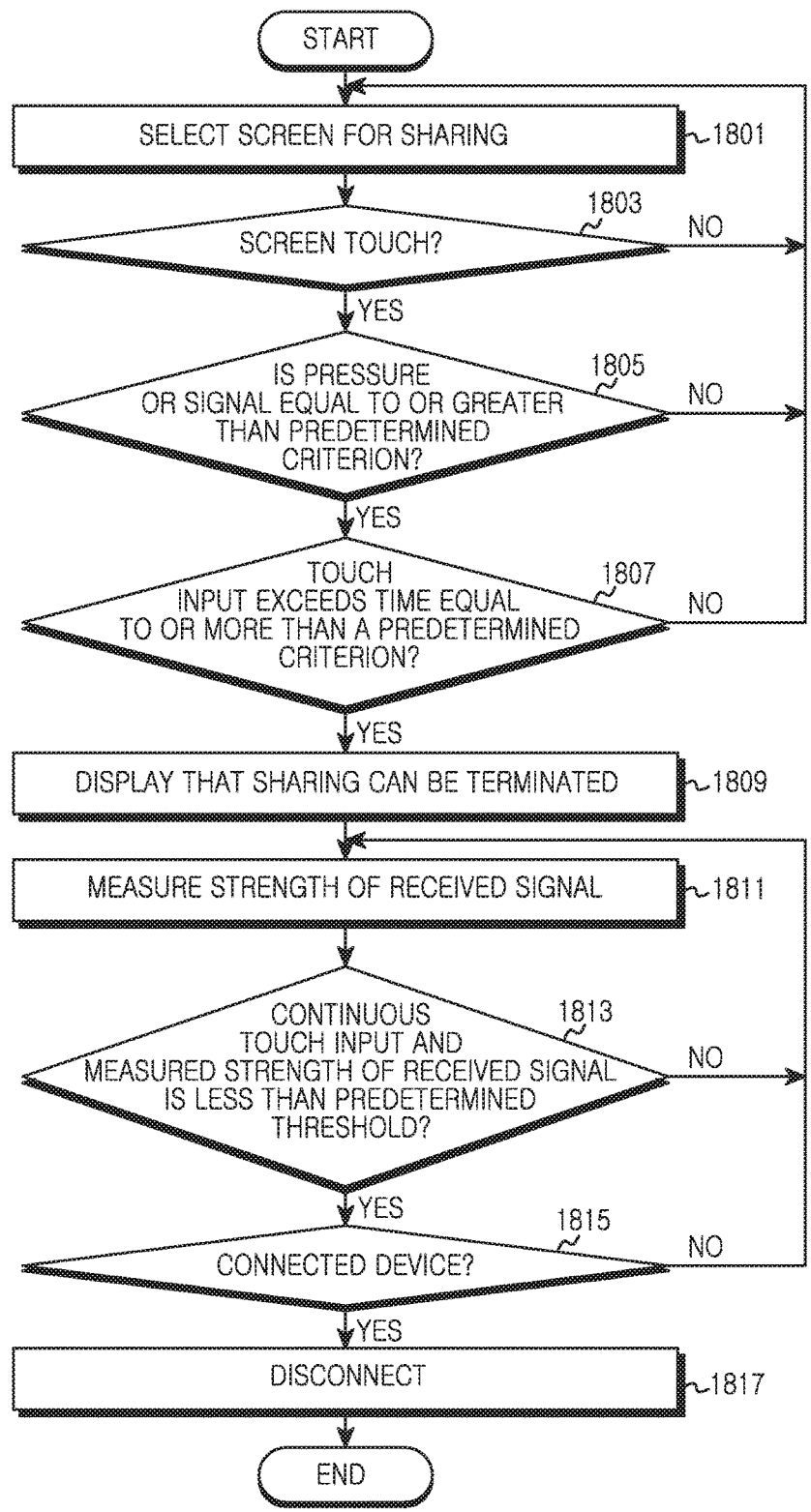
FIG. 18 is a flowchart illustrating an operation of terminating a connection with a second electronic device 200 in a first electronic device 100 according to an embodiment of the present invention.

FIG. 18 is a flowchart illustrating an operation of terminating a connection with a second electronic device 200 in a first electronic device 100 according to an embodiment of the present invention.

Referring to FIG. 18, the first electronic device 100 proceeds to step 1801, in which the first electronic device detects a selection input for a screen shared with the second electronic device 200, by the user of the first electronic device 100. The user may select a content screen that is being mirrored from the first electronic device 100 to the second electronic device 200 or a screen for transmitting a file to the second electronic device 200.

The first electronic device 100 proceeds to step 1803, in which the first electronic device checks whether a touch signal is input to the screen of the first electronic device 100. The first electronic device 100 may detect a touch input by the user for the content screen that is being mirrored from the first electronic device 100 to the second electronic device 200 or for the screen on which the file is transmitted to the second electronic device 200.

The first electronic device 100 proceeds to step 1805, in which the first electronic device checks whether the touch input is performed with pressure equal to or greater than a predetermined criterion. The first electronic device 100 may determine whether the touch input, by the user of the first electronic device 100, to the touch screen of the first electronic device 100 is performed with pressure equal to or more than a certain criterion. When the first electronic device 100 checks that the touch input is not performed with pressure equal to or more than the predetermined criterion, the process may return to step 1803.

When the touch input is performed with pressure equal to or greater than a predetermined criterion, the first electronic device 100 proceeds to step 1807, in which the first electronic device determines whether the touch input exceeds a time equal to or more than a predetermined criterion. The first electronic device 100 may determine whether the touch input from the user exceeds a time equal to or more than a predetermined criterion. When the touch input from the user does not exceed the time equal to or more than a predetermined criterion, the process returns to step 1805 and the first electronic device 100 may check again whether the touch input from the user is performed with pressure equal to or greater than a predetermined criterion.

When the touch input from the user exceeds the time equal to or more than a predetermined criterion, the first electronic device 100 proceeds to step 1809, in which the first electronic device displays an indication that the content mirroring or file transmission is terminated. For example, when the touch input from the user exceeds the time equal to or more than a predetermined criterion, the first electronic device 100 may display, on the display unit of the first electronic device 100, an indication that indicates how near or far the distance is to the second electronic device 200. For example, when the distance to the second electronic device 200 exceeds a predetermined threshold value, the first electronic device 100 may display, on the display unit of the first electronic device 100, an indication that the distance to the second electronic device 200 exceeds a predetermined threshold and an indication that the connection with the second electronic device 200 may be terminated when the user terminates the touch input.

The first electronic device 100 proceeds to step 1811, in which the first electronic device discovers a signal of the at least one other electronic device and measures the strength of the signal received from the at least one other electronic device. The first electronic device 100 may discover the signal from the at least one other electronic device. The first electronic device 100 may receive a signal for measuring the reception signal strength from the at least one other electronic device.

The first electronic device 100 proceeds to step 1813, in which the first electronic device determines whether the continuous touch input from the user and the strength of the reception signal become less than a predetermined threshold. The first electronic device 100 may determine whether the continuous touch input of the user is performed on the touch screen of the first electronic device 100 and whether the strength of the signal received from the at least one other electronic device is less than a predetermined threshold. When the continuous touch input from the user is checked and the strength of the reception signal becomes less than a predetermined threshold value, the first electronic device 100 proceeds to step 1815, in which the first electronic device checks whether the reception signal having the strength less than the predetermined threshold is a signal from the second electronic device 200. When the continuous touch input from the user or the strength of the reception signal is not less than a predetermined threshold value, the process returns to step 1811 and the first electronic device 100 may measure the strength of the signal received from the at least one other electronic device.

When the reception signal having the strength that has become less than a predetermined threshold in the step 1815 is the signal from the second electronic device 200, the first electronic device 100 proceeds to step 1817, in which the first electronic device terminates the transmission of the content mirroring signal or the file to be transmitted to the second electronic device 200, and releases the connection with the second electronic device 200. According to another embodiment of the present invention, when the second electronic device 200 is a speaker, the first electronic device 100 may output a sound content through the first electronic device 100 when the sound content mirroring to the second electronic device 200 is terminated. According to another embodiment of the present invention, when the connection with the second electronic device 200 is terminated, the first electronic device 100 may terminate the playback of the mirrored content at the same time.

Figure 19:
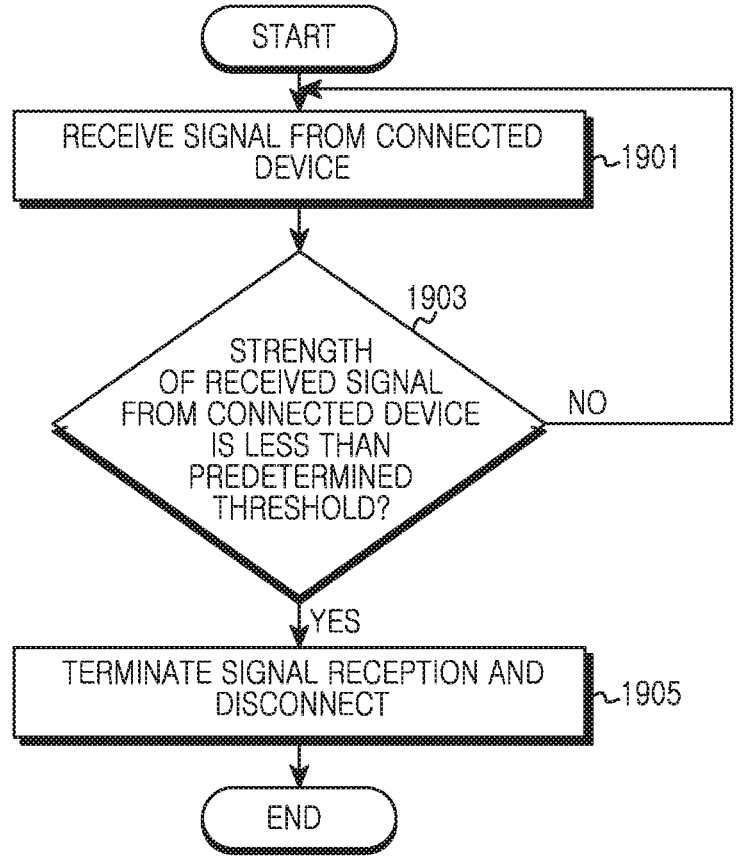
FIG. 19 is a flowchart illustrating an operation of terminating a connection with a first electronic device 100 in a second electronic device 200 according to an embodiment of the present invention.

FIG. 19 is a flowchart illustrating an operation of terminating a connection with a first electronic device 100 in a second electronic device 200 according to an embodiment of the present invention.

Referring to FIG. 19, the second electronic device 200 proceeds to step 1901, in which the second electronic device receives a file or content mirroring signal from the first electronic device 100. The second electronic device 200 may receive the file or the content mirroring signal from the first electronic device 100.

The second electronic device 200 proceeds to step 1903, in which the second electronic device determines whether the strength of a signal received from the second electronic device 200 becomes less than a predetermined threshold. When the strength of the signal received from the first electronic device 100 becomes less than the predetermined threshold value, the processor proceeds to step 1905 and the second electronic device 200 releases the connection with the first electronic device 100, and terminates the reception of the file or the reception of the content mirroring signal from the first electronic device 100. According to another embodiment of the present invention, when terminating the connection with the first electronic device 100, the second electronic device 200 may display, on the display unit of the second electronic device 200, an indication that the connection with the first electronic device 100 is terminated.

When the strength of a signal received from the first electronic device 100 is not less than the predetermined threshold value, the second electronic device 200 maintains a state for receiving the file or content mirroring signal from the first electronic device 100.

Methods stated in claims and/or specifications according to various embodiments may be implemented by hardware, software, or a combination of hardware and software.

In the implementation of software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present invention as defined by the appended claims and/or disclosed herein.

Although specific exemplary embodiments have been described in the detailed description of the present invention, various change and modifications may be made without departing from the spirit and scope of the present invention. Therefore, the scope of the present invention should not be defined as being limited to the embodiments, but should be defined by the appended claims and equivalents thereof.

An electronic device according to an embodiment of the present invention can be automatically connected and released to devices which can perform communication, such as, an access point, a television, a speaker, a smart phone, and the like without being recognized by a user.

An electronic device according to an embodiment of the present invention provides an effect of which a service can be started by using a simple operation in a state of checking only an application, a user interface, and the like without checking, by the user, a connection process between communicable devices.

An electronic device according to an embodiment of the present invention provides an effect of which data to be shared between communicable devices can be automatically shared therebetween regardless of the connectivity.

The invention claimed is:

1. A first electronic device comprising:
a display unit;
at least one processor;
an input unit;
an output unit; and
a transceiver,
wherein the input unit recognizes occurrence of a touch input for receiving contents,
wherein the transceiver receives the contents from a second electronic device based on a received signal strength of a discovery signal or a response signal, received from the second electronic device,
wherein the at least one processor is configured to control at least one of the display unit and the output unit so as to indicate that content reception from the second electronic device is possible,
wherein, if receiving, from the second electronic device, a message requesting transmission of a content mirroring signal for mirroring at least one mirror content being played back by the second electronic device to the first electronic device, at least one of the display unit and the output unit outputs at least one of an indication and an audio signal for notifying that reception of the content mirroring signal from the second electronic device is possible, the transceiver receives the content mirroring signal from the second electronic device, and the display unit plays back the at least one mirror content successively from a time point at which the content playback is terminated in the second electronic device.

2. The first electronic device of claim 1,
wherein the transceiver comprises a first transceiver for low energy communication, a second transceiver for wireless local area network (WLAN) communication, and a third transceiver for mobile communication,
wherein the transceiver is configured to:
receive, from the second electronic device, the discovery signal or the response signal through the first transceiver,
transmit a connection request message to the second electronic device based on the discovery signal or the response signal,
establish a communication connection to the second electronic device through at least one of the first transceiver, the second transceiver, and the third transceiver based on a response message from the second electronic device, and
transmit information notifying that a first electronic device has a right for setting the second transceiver when the second transceiver is used, and
wherein the at least one processor is configured to generate information notifying that the first electronic device has the right for setting the second transceiver.

3. The first electronic device of claim 1,
wherein the at least one processor is configured to:
determine the received signal strength of the discovery signal or the response signal,
determine whether the pressure of the touch input for the input unit is equal to or greater than a predetermined pressure value,
if the pressure of the touch input is equal to or greater than the predetermined pressure value, determine whether the touch input has been input for at least a predefined time, and
if the received signal strength of the discovery signal or the response signal is equal to or greater than a threshold value corresponding to the discovery signal or the response signal and the touch input is performed for at least the predefined time, determine whether to receive the contents from the second electronic device based on the discovery signal or the response signal.

4. The first electronic device of claim 1,
wherein the transceiver is configured to:
receive information on a third electronic device connected to the second electronic device,
transmit, to the second electronic device, a message requesting the third electronic device transmits, to the first electronic device, a response signal for a discovery signal transmitted by the first electronic device,
transmit the discovery signal to the third electronic device,
receive a response signal from the third electronic device, and
transmit the contents to the third electronic device based on the response signal.

5. The first electronic device of claim 1,
wherein the transceiver comprises at least one of a first transceiver for low energy communication, a second transceiver for wireless local area network (WLAN) communication, and a third transceiver for mobile communication, and
wherein the transceiver is configured to receive contents from the second electronic device through at least one of the first transceiver, the second transceiver, and the third transceiver based on a discovery signal or a response signal, received from the second electronic device.

6. The first electronic device of claim 5,
wherein if receiving, from the second electronic device, a message requesting transmission of a content mirroring signal for mirroring contents being played back by the first electronic device to the second electronic device, at least one of the display unit and the output unit outputs at least one of an indication and an audio signal for notifying that a transmission of the content mirroring signal to the second electronic device is possible,
the transceiver transmits the content mirroring signal to the second electronic device, and
the display unit terminates the playback of the contents when the transceiver transmits the content mirroring signal to the second electronic device.

7. The first electronic device of claim 5,
wherein the transceiver is configured to:
transmit, to the second electronic device, information on a third electronic device connected to the first electronic device,
receive, from the second electronic device, a message requesting the third electronic device to transmit, to the second electronic device, a response signal for a discovery signal transmitted by the second electronic device, and
transmit the message to the third electronic device.

8. The first electronic device of claim 5, wherein the transceiver is configured to:
transmit information on the first electronic device to the second electronic device connected to the first electronic device,
receive, from the second electronic device, a message requesting transmission, to a third electronic device, of a response signal for a discovery signal transmitted by the third electronic device,
transmit, to the third electronic device, a response signal for the discovery signal transmitted by the third electronic device, and
receive contents from the third electronic device, and
wherein the information on the first electronic device includes at least one of a type of the first electronic device, a communication scheme of the first electronic device, and a function of the first electronic device.

9. An operation method for a first electronic device comprising:
recognizing occurrence of a touch input for content reception;
receiving the contents from a second electronic device based on a received signal strength of a discovery signal or a response signal, received from the second electronic device;
indicating that reception of the contents from the second electronic device is possible;
if receiving, from the second electronic device, a message requesting transmission of a content mirroring signal for mirroring at least one mirror content being played back by the second electronic device to the first electronic device, outputting at least one of an indication and an audio signal for notifying that reception of the content mirroring signal from the second electronic device is possible, receiving the content mirroring signal from the second electronic device, and playing back the at least one mirror content successively from a time point at which the content playback is terminated in the second electronic device.

10. The method for the first electronic device of claim 9, comprising:
receiving the contents to and from the second electronic device through at least one of a first transceiver for low energy communication, a second transceiver for wireless local area network (WLAN) communication, and a third transceiver for mobile communication based on a discovery signal or a response signal, received from the second electronic device.

11. The method for the first electronic device of claim 10, comprising:
transmitting information on the first electronic device to the second electronic device connected to the first electronic device;
receiving, from the second electronic device, a message requesting transmission, to a third electronic device, of a response signal for a discovery signal transmitted by the third electronic device;
transmitting the response signal for the discovery signal transmitted by the third electronic device to the third electronic device; and
receiving contents from the third electronic device based on the response signal,
wherein the information on the first electronic device includes at least one of a type of the first electronic device, a communication scheme of the first electronic device, and a function of the first electronic device.

12. The method for the first electronic device of claim 10, comprising:
if receiving, from the second electronic device, a message requesting transmission of a content mirroring signal for mirroring contents being played back by the second electronic device to the first electronic device, outputting at least one of an indication and an audio signal for notifying that the reception of the content mirroring signal from the second electronic device is possible,
receiving the content mirroring signal from the second electronic device, and
playing back the contents successively from a time point at which the content playback is terminated in the second electronic device.

13. The method for the first electronic device of claim 10, comprising:

transmitting to the second electronic device, information on a third electronic device connected to the first electronic device, receiving from the second electronic device, a message requesting the third electronic device to transmit, to the second electronic device, a response signal for a discovery signal transmitted by the second electronic device, and transmitting the message to the third electronic device.

14. The method for the first electronic device of claim 9, comprising:

receiving from the second electronic device, the discovery signal or the response signal through a first transceiver, transmitting a connection request message to the second electronic device based on the discovery signal or the response signal, establishing a communication connection to the second electronic device through at least one of the first transceiver, a second transceiver, and the third transceiver based on a response message from the second electronic device, transmitting information notifying that the first electronic device has a right for setting the second transceiver when the second transceiver is used, and wherein the transceiver comprises the first transceiver for low energy communication, the second transceiver for wireless local area network (WLAN) communication, and the third transceiver for mobile communication, and wherein the information is generated by at least one processor.

15. The method for the first electronic device of claim 9, comprising:

determining the received signal strength of the discovery signal or the response signal, determining whether a pressure of the touch input is equal to or greater than a predetermined pressure value, determining whether the touch input has been input for at least a predefined time, if the pressure of the touch input is equal to or greater than the predetermined pressure value, and determining whether to receive the contents from the second electronic device based on the received discovery signal or response signal, if the received signal strength of the discovery signal or the response signal is equal to or greater than a threshold value corresponding to the received discovery signal or the response signal and the touch input is performed for at least the predefined time.

16. The method for the first electronic device of claim 9, comprising:

receiving information on a third device connected to the second electronic device, transmitting to the second electronic device, a message requesting the third electronic device transmits, to the first electronic device, a response signal for a discovery signal transmitted by the first electronic device, transmitting the discovery signal to the third electronic device, receiving a response signal from the third electronic device, and transmitting the contents to the third electronic device based on the response signal.

\* \* \* \* \*